US010193871B2

(12) United States Patent
Asano

(10) Patent No.: US 10,193,871 B2
(45) Date of Patent: Jan. 29, 2019

(54) INFORMATION PROCESSING APPARATUS, CONTROL METHOD, AND PROGRAM

(71) Applicant: CANON KABUSHIKI KAISHA, Tokyo (JP)

(72) Inventor: Ayumu Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 364 days.

(21) Appl. No.: 14/938,607

(22) Filed: Nov. 11, 2015

(65) Prior Publication Data
US 2016/0142383 A1 May 19, 2016

(30) Foreign Application Priority Data
Nov. 13, 2014 (WO) .................. PCT/JP2014/080094

(51) Int. Cl.
H04L 29/06 (2006.01)
H04L 9/14 (2006.01)

(52) U.S. Cl.
CPC ............ H04L 63/0428 (2013.01); H04L 9/14 (2013.01); H04L 63/0823 (2013.01); H04L 2209/24 (2013.01)

(58) Field of Classification Search
CPC ... H04L 63/0428; H04L 9/14; H04L 63/0823; H04L 2209/24
See application file for complete search history.

(56) References Cited

U.S. PATENT DOCUMENTS 6,538,668 B1* 3/2003 Ruberg ................. H04L 29/06
709/220
8,005,969 B2 8/2011 Miyazawa et al.
(Continued)

FOREIGN PATENT DOCUMENTS

RU 2273102 C2 3/2006
RU 2485710 C1 6/2013

OTHER PUBLICATIONS

Onvif, "Core Specification," Version 2.4.2, Jun. 2014.
(Continued)

Primary Examiner — Hadi S Armouche
Assistant Examiner — Paul E Callahan
(74) Attorney, Agent, or Firm — Canon U.S.A., Inc. IP Division

(57) ABSTRACT

An information processing apparatus includes first processing means for performing a setting for performing encrypted communication on the information processing apparatus in response to a command based on a first communication procedure, second processing means for performing a setting for performing encrypted communication on the information processing apparatus in response to a command based on a second communication procedure, and transmitting means for transmitting information indicating that the setting for performing the encrypted communication is made in response to the command based on the first communication procedure to a reception apparatus if the command based on the second communication procedure is received from the reception apparatus after the first processing means performs the setting for performing the encrypted communication on the information processing apparatus in response to the command based on the first communication procedure.

19 Claims, 16 Drawing Sheets

(56) References Cited

U.S. PATENT DOCUMENTS

| | | | |
|---|---|---|---|
| 9,432,390 B2* | 8/2016 | Freeze-Skret | H04L 63/08 |
| 2005/0086240 A1 | 4/2005 | Richardson et al. | |
| 2009/0222659 A1 | 9/2009 | Miyabayashi et al. | |
| 2013/0061041 A1 | 3/2013 | Inoue | |
| 2014/0074977 A1 | 3/2014 | Niida | |

OTHER PUBLICATIONS

Onvif, "Advanced Security Service Specification," Version 1.0.2, Jun. 2014.
Masutaringu, "TCP/IP IPsec," Ohmsha, May 23, 2006, pp. 158-164.

* cited by examiner

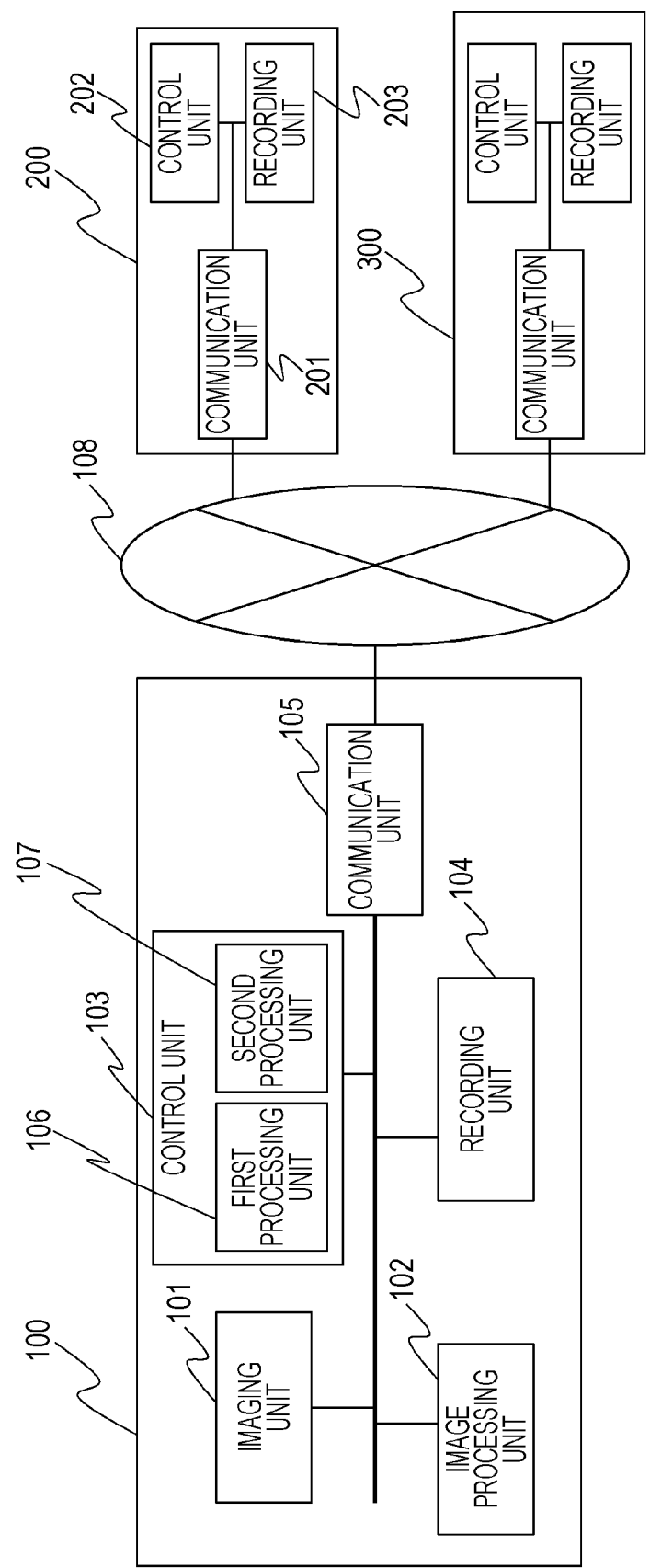

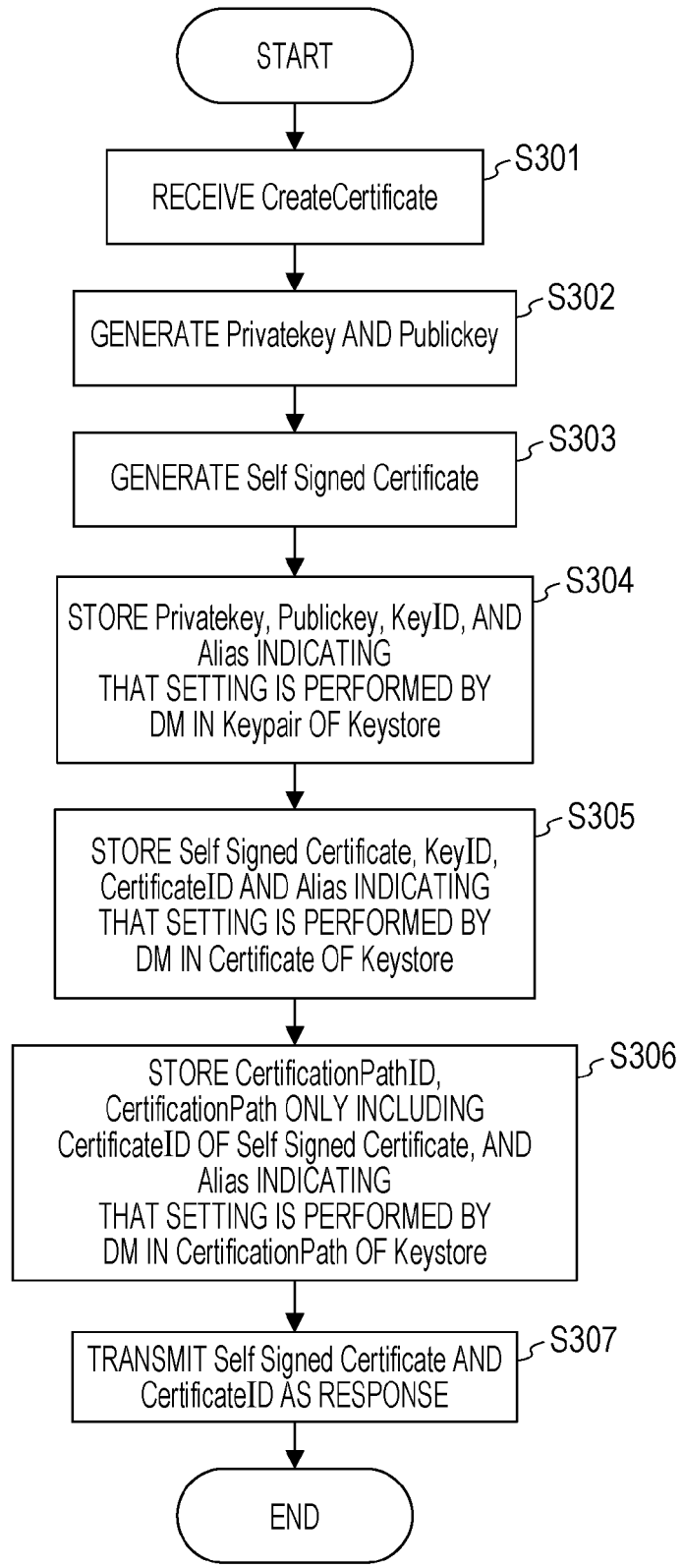

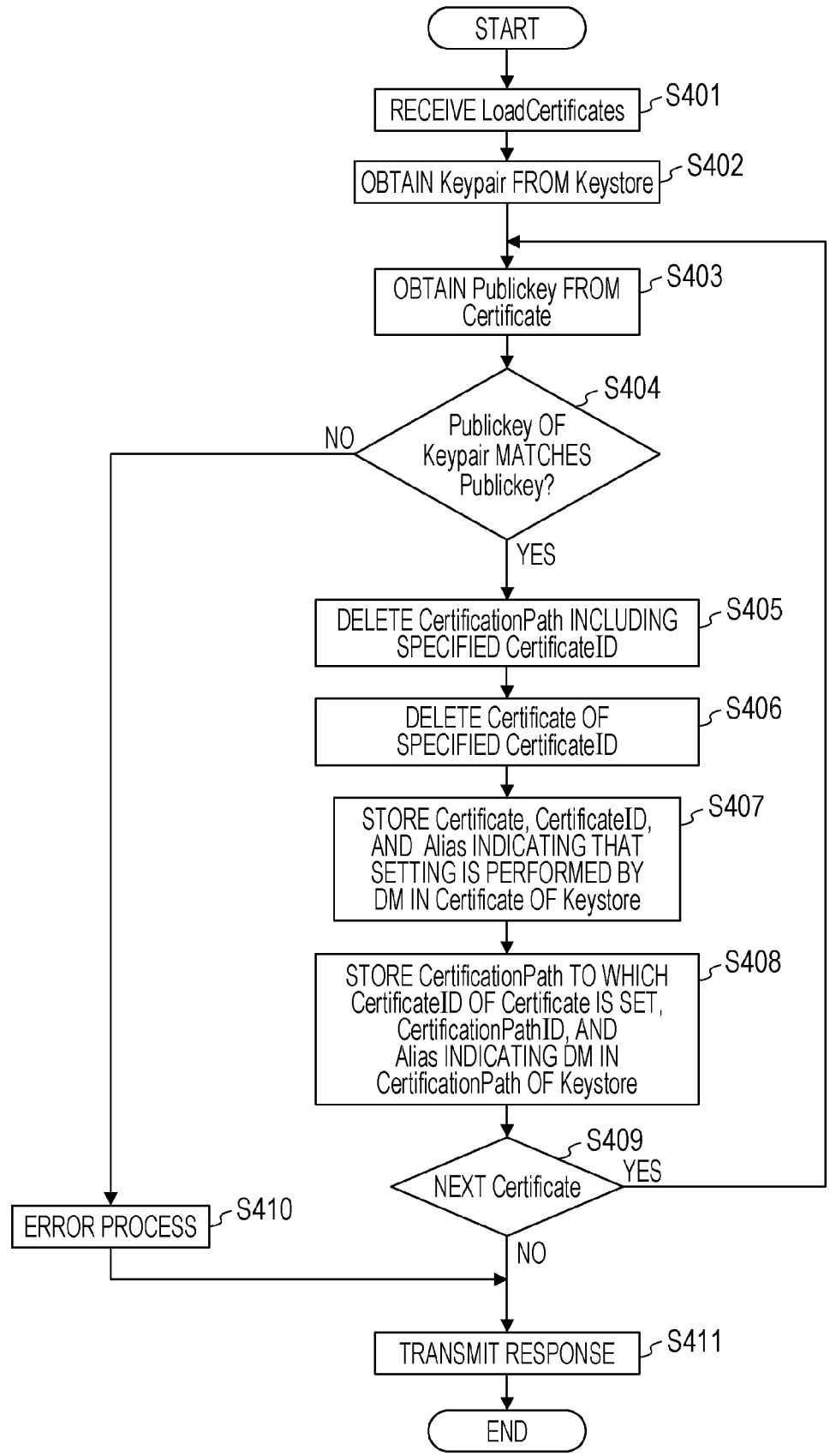

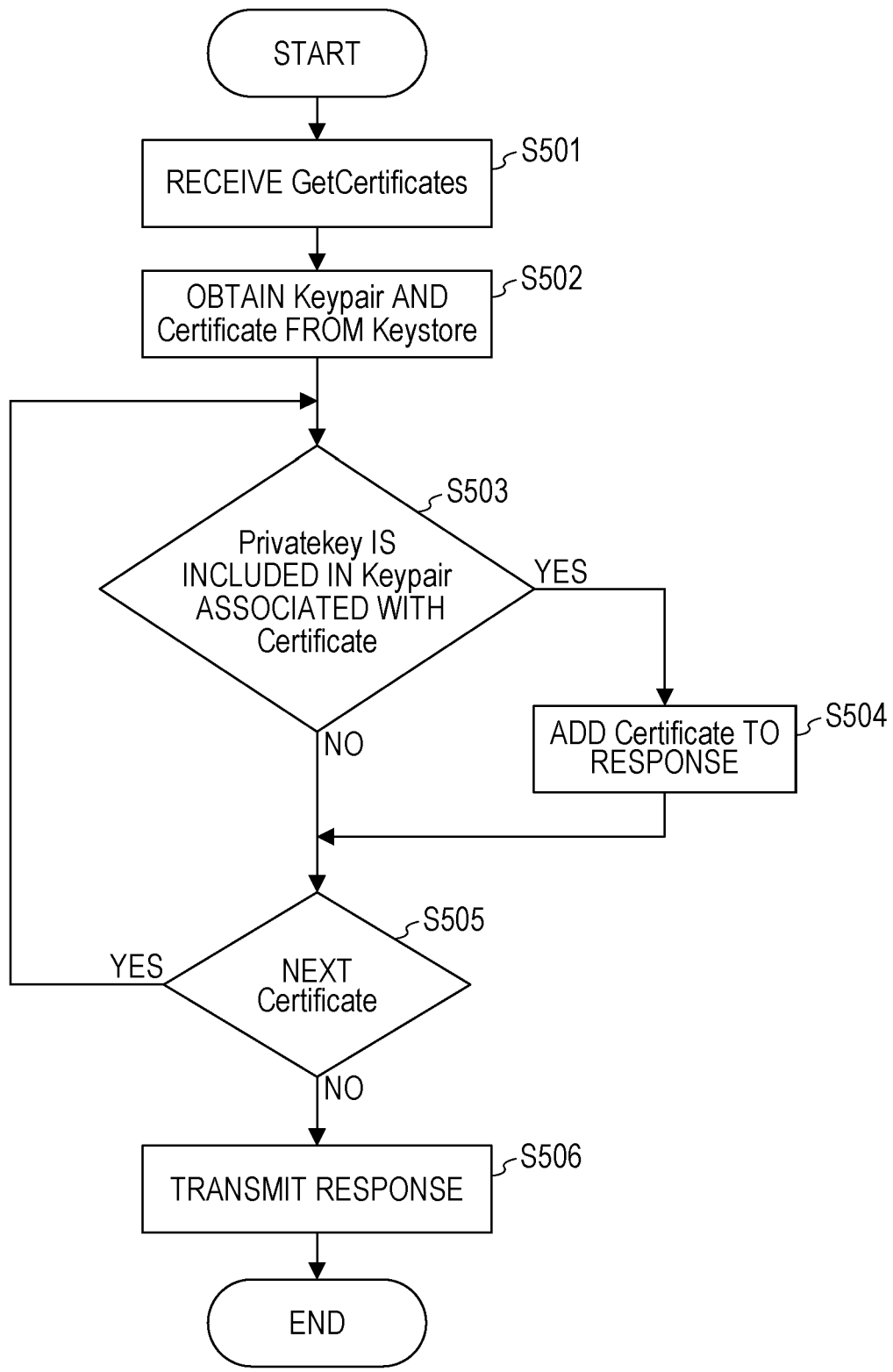

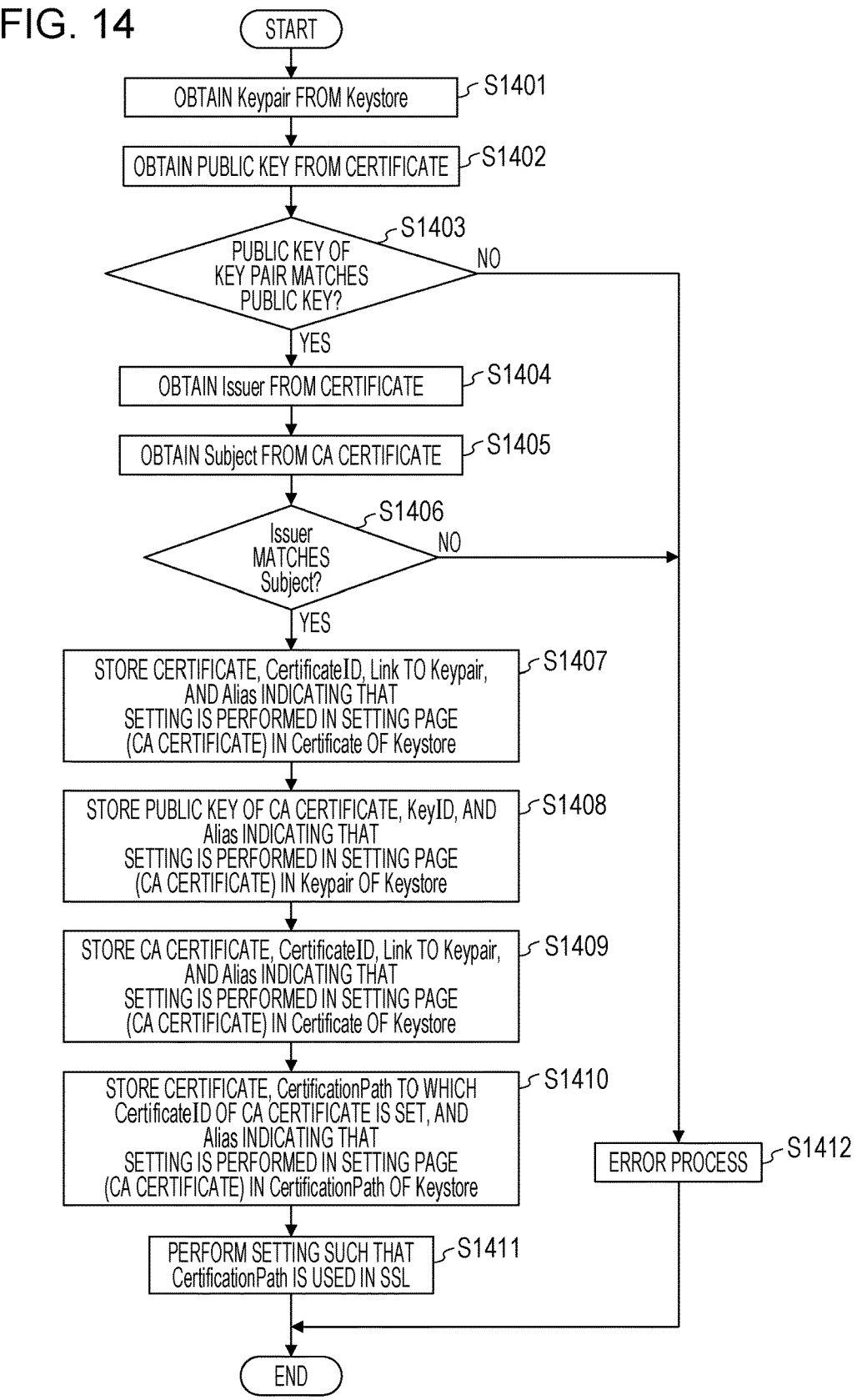

INFORMATION PROCESSING APPARATUS, CONTROL METHOD, AND PROGRAM

TECHNICAL FIELD

The present invention relates to a setting of a security function in an information processing apparatus which transmits a captured image to a client apparatus through a network.

BACKGROUND ART

In general, a technique of performing a setting for a security function of an imaging apparatus on the imaging apparatus by a client apparatus connected to the imaging apparatus through a network has been known.

For example, the client apparatus may instruct the imaging apparatus to generate a key and set a certificate which are used for a communication process employing a secure sockets layer (SSL) protocol.

As a command for setting a security function to an imaging apparatus by a client apparatus, a command group defined by a specification developed by open network video interface forum (ONVIF) is known. In the ONVIF, settings of the SSL, IEEE802.1X, and authentication of a client are standardized in association with the security function.

For example, a command defined in the device management service of the ONVIF (NPL 1) may be transmitted from a client apparatus to an imaging apparatus so that generation of a key and a setting of a certificate are performed in the imaging apparatus which supports the device management service.

Furthermore, for example, a command defined in the advanced security service of the ONVIF (NPL 2) may be transmitted from the client apparatus to the imaging apparatus so that generation of a key and a setting of a certificate are performed in the imaging apparatus which supports the advanced security service.

CITATION LIST

Non Patent Literature

NPL 1 ONVIF-Core-Specification-v242(http://www.onvif.org/specs/core/ONVIF-Core-Specification-v242.pdf)

NPL 2 ONVIF-AdvancedSecurity-Service-Spec-v102 (http://www.onvif.org/specs/srv/security/ONVIF-AdvancedSecurity-Service-Spec-v102.pdf)

In a case where a plurality of communication procedures (protocols) may be used by a client apparatus for setting a security function to an information processing apparatus (an imaging apparatus, for example), it is likely that the following problem arises. Specifically, content of the setting associated with the security function made in the information processing apparatus by a first communication procedure may not be referred to by a client apparatus which employs a second communication procedure different from the first communication procedure.

SUMMARY OF INVENTION

To attain the object described above, the present invention provides an information processing apparatus includes first processing means for performing a setting for performing encrypted communication on the information processing apparatus in response to a command based on a first communication procedure, second processing means for performing a setting for performing encrypted communication on the information processing apparatus in response to in command based on a second communication procedure, and transmitting means for transmitting information indicating that the setting for performing the encrypted communication is made in response to the command based on the first communication procedure to a reception apparatus if the command based on the second communication procedure is received from the reception apparatus after the first processing means performs the setting for performing the encrypted communication on the information processing apparatus in response to the command based on the first communication procedure.

Further features of the present invention will become apparent from the following description of exemplary embodiments with reference to the attached drawings.

BRIEF DESCRIPTION OF DRAWINGS

FIG. 1A is a block diagram illustrating a security communication system according to a first embodiment.

FIG. 2A is a diagram illustrating a process of setting a certificate and so on.

FIG. 2B is a diagram illustrating the process of setting a certificate and so on.

FIG. 3 is a flowchart illustrating a process of generating a certificate.

FIG. 4 is a flowchart illustrating a process of loading the certificate.

FIG. 5 is a flowchart illustrating a process of obtaining the certificate.

FIG. 14 is a flowchart illustrating a process using a certificate signed by a CA.

DESCRIPTION OF EMBODIMENTS

Figure 1B:
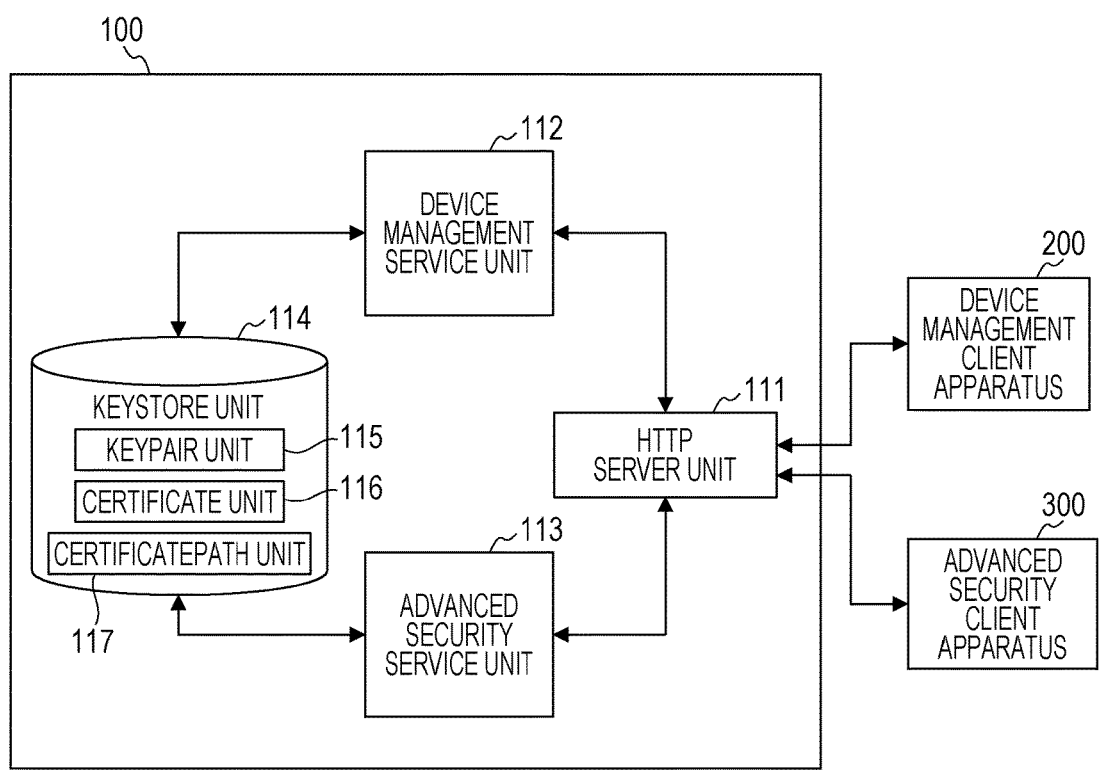
FIG. 1B is a block diagram illustrating the security communication system according to the first embodiment.

Hereinafter, embodiments of the present invention will be described in detail with reference to the accompanying drawings.

First Embodiment

In this embodiment, a case where first and second client apparatuses perform settings of a security function on an imaging apparatus serving as an information processing apparatus in accordance with procedures prescribed by the ONVIF will be described as an example.

In this embodiment, the first client apparatus performs a setting of a security function on the imaging apparatus on the basis of a device management service (hereinafter referred to as a "DM service") prescribed by the ONVIF (a first procedure). Furthermore, the second client apparatus performs a setting of the security function on the imaging apparatus on the basis of an advanced security service (hereinafter referred to as an "AS service") prescribed by the ONVIF (a second procedure).

Here, the DM service and the AS service prescribed by the ONVIF are independent services. A client apparatus communicating with the imaging apparatus by one of the services may not refer to content of the setting set to the imaging apparatus on the basis of the other of the services.

For example, the first client apparatus performs a setting of the security function on the imaging apparatus on the basis of the DM service. Thereafter, the second client apparatus attempts to refer to the setting of the security function set in the imaging apparatus using a command prescribed by the AS service. In this case, the second client apparatus may not refer to content of the security setting made on the basis of the DM service by the first client apparatus.

Therefore, even in the case where the first client apparatus has performed the security setting on the imaging apparatus, the second client apparatus may not recognize that the setting has been performed on the imaging apparatus. Accordingly, it is likely that a user of the second client apparatus newly performs a security setting on the imaging apparatus and the existing setting is replaced by the new security setting.

Accordingly, the imaging apparatus according to this embodiment records information indicating that a setting has been performed on the imaging apparatus using a command prescribed by the DM service in the imaging apparatus as Alias information prescribed by the AS service. By this, even the client apparatus employing the AS service may recognize that the setting of the security function has been performed on the basis of the DM service. In this way, the client apparatus which performs the setting on the imaging apparatus using one of the protocols may recognize that the setting has been performed using the other of the protocols.

Furthermore, if a security setting is performed on the basis of the DM service, the imaging apparatus of this embodiment automatically generates and records, using content of the setting, content of a setting based on the AS service. Then the imaging apparatus records information indicating that the content of the setting based on the AS service has been generated in response to a command for the security setting by the DM service as Alias information.

For example, the imaging apparatus receives a command for causing the imaging apparatus to generate a certificate to be used for encrypted communication on the basis of the DM service. In this case, the imaging apparatus automatically performs a setting of a certification path and a setting of a key pair which are required for the security setting based on the AS service and which are not prescribed in the security setting based on the DM service. Then the imaging apparatus records information indicating that the setting of a certification path and the setting of a key pair have been performed in response to a reception of a command based on the DM service as Alias information.

By this, the user may recognize that the security setting based on the AS service has been performed in response to the command based on the DM service.

An example of a configuration of hardware of an imaging system according to the first embodiment will be described with reference to FIG. 1A. In the first embodiment, a case where an imaging apparatus 100 is connected to client apparatuses 200 and 300 through a network 108 will be described as an example. In this embodiment, the imaging apparatus 100 transmits a captured image to the client apparatuses 200 and 300 through the network. Although an imaging unit 101 is incorporated in the imaging apparatus 100 in this embodiment, the present invention is not limited to this. Any configuration may be employed as long as a setting of security for transmitting a captured image is managed, and instead of the imaging apparatus 100, an information processing apparatus which receives a captured image from an external imaging apparatus and relays the captured image to the client apparatuses 200 and 300 may be employed.

Image data captured by the imaging unit 101 of the imaging apparatus 100 is processed by an image processing unit 102 described below, and thereafter, transmitted to the client apparatuses 200 and 300 through the network 108.

The imaging unit 101 captures an image of a subject and generates an image signal. The imaging unit 101 is constituted by a lens and an imaging element, such as a complementary metal oxide semiconductor (CMOS). The imaging element converts an image of a subject formed by the lens into an image signal.

The image processing unit 102 performs an image process on the image signal generated by the imaging unit 101. The image processing unit 102 encodes the image captured by the imaging unit 101, for example. The image processing unit 102 is a processor, such as a central processing unit (CPU), for example. Alternatively, the image processing unit 102 is a processor performing an image process, such as a graphics processing unit (GPU), for example.

A control unit 103 of the imaging apparatus 100 controls components included in the imaging apparatus 100 illustrated in FIG. 1A. The control unit 103 is a processor, such as a CPU, for example. In a case where the control unit 103 is configured as a processor, the control unit 103 executes programs recorded in a recording unit 104 described below so as to control the components included in the imaging apparatus 100.

The control unit 103 performs control so as to realize functions of the imaging apparatus 100 described below with reference to FIG. 1B. In particular, the control unit 103 includes a first processing unit 106 which realizes a function of a device management service unit 112 (hereinafter referred to as a "DM service unit 112") described below with reference to FIG. 1B. Furthermore, the control unit 103 includes a second processing unit 107 which realizes a function of an advanced security service unit 113 (hereinafter referred to as a "AS service unit 113") described below. The control unit 103 performs control such that information indicating that a setting has been performed on the imaging apparatus 100 in response to a command based on one of different communication procedures is recorded in the recording unit 104.

The recording unit 104 records an image which has been captured by the imaging unit 101 and which has been subjected to the image process performed by the image processing unit 102. Furthermore, the recording unit 104 records therein the programs and control parameters to be used by the control unit 103. In addition, the recording unit 104 records content of various settings to be recorded in a keystore unit 114 described below.

The recording unit 104 may be a memory, such as a random access memory (RAM) or a read only memory (ROM), for example. Alternatively, the recording unit 104 may be a recording medium, such as a hard disk drive (HDD). Furthermore, the recording unit 104 may be a removable medium, such as a flash memory or a memory card.

A communication unit 105 transmits the image which is captured by the imaging unit 101 and which is subjected to the image process performed by the image processing unit 102 to the client apparatuses 200 and 300. When the captured image is transmitted, communication encrypted in accordance with setting information recorded in the recording unit 104 is used. Furthermore, the communication unit 105 transmits information indicating that a setting has been performed on the imaging apparatus 100 in accordance with a command based on one of the first and second communication procedures to the client apparatus 200 or the client apparatus 300 in accordance with a command based on the other of the first and second communication procedures. Furthermore, the communication unit 105 receives control commands issued by the client apparatuses 200 and 300 to the imaging apparatus 100.

In a case where the communication unit 105 receives a command based on the second communication procedure from the client apparatus 300 after the first processing unit performs a setting for the encrypted communication on the imaging apparatus 100, the communication unit 105 transmits the following information. Specifically, the communication unit 105 transmits information indicating that a setting for performing the encrypted communication has been performed in response to a command based on the first communication procedure to the client apparatus 300.

The client apparatuses 200 and 300 perform settings of communication security on the imaging apparatus 100. The client apparatus 200 includes a communication unit 201 used to perform communication with the imaging apparatus 100, for example. The client apparatus 200 further includes a control unit 202 used to control components of the client apparatus 200. The control unit 202 is a processor, such as a CPU, for example. In a case where the control unit 202 is configured as a processor, the control unit 202 executes programs recorded in a recording unit 203 described below so as to control the components included in the client apparatus 200. The client apparatus 200 further includes the recording unit 203 which records therein the programs and control parameters to be used by the control unit 202. The recording unit 203 is a memory, such as a RAM or a ROM, for example. Alternatively, the recording unit 203 may be a recording medium, such as an HDD. Furthermore, the recording unit 203 may be a removable medium, such as a flash memory or a memory card.

A configuration of the client apparatus 200 is not particularly limited and is not limited to that described above. Portions of the configuration described above may be replaced by other components, or other components may be added to the configuration described above. A configuration of the client apparatus 300 is the same as that of the client apparatus 200, and therefore, a description thereof is omitted.

The client apparatuses 200 and 300 are personal computers (PCs), for example. Alternatively, the client apparatuses 200 and 300 may be mobile terminals, such as tablet terminals and smartphones.

The network 108 is constituted by the Internet, a wired local area network (LAN), a wireless LAN, a wide area network (WAN), an analog cable, or the like. A communication standard, a size, and a configuration of the network 108 are not limited. As a communication standard of the LAN, Ethernet (registered trademark), for example, may be used.

Next, functions of the imaging apparatus 100 and the client apparatuses 200 and 300 of this embodiment will be described with reference to a functional block of FIG. 1B.

The client apparatus 200 illustrated in FIG. 1B has a function of transmitting a command associated with security of the DM service to the imaging apparatus 100. The client apparatus 300 has a function of transmitting a command of the AS service to the imaging apparatus 100. The client apparatuses 200 and 300 have a function of setting a key (Key) and a certificate (Certificate) to the imaging apparatus 100 through the network 108. The certificate indicates that the key included in the certificate has been registered in a certification authority. The certificate indicates that a key described in the certificate has been registered in a certification authority and includes, for example, information on a public key registered in the certification authority, information on an owner of the public key, information on the certification authority which has issued the certificate, and a signature of the certification authority which has issued the certificate.

The imaging apparatus 100 supports the DM service and the AS service prescribed by the ONVIF. Specifically, the imaging apparatus 100 of this embodiment performs a setting of a security function if receiving a command used in the DM service. Furthermore, the imaging apparatus 100 of this embodiment may perform a setting of the security function if receiving a command used in the AS service.

An HTTP server unit 111 of the imaging apparatus 100 receives a SOAP message transmitted from the client apparatus 200 or the client apparatus 300. The SOAP message is transmitted and received using a simple object access protocol (SOAP).

The HTTP server unit 111 receives a SOAP message transmitted from the client apparatuses 200 and 300. Then the HTTP server unit 111 transmits the received message to the DM service unit 112 or the AS service unit 113.

The client apparatuses 200 and 300 post the SOAP message to a uniform resource identifier (URI) which specifies the DM service unit 112 or the AS service unit 113 of the imaging apparatus 100. The SOAP message may be thus transmitted. The posting of the message is executed using a posting method of the hypertext transfer protocol (HTTP). In this embodiment, the function of the HTTP server unit 111 is realized by the communication unit 105 illustrated in FIG. 1A.

Each of the DM service unit 112 and the AS service unit 113 analyzes the received SOAP message and returns a setting of security or set content of the imaging apparatus 100 in accordance with a command and the set content as a response. In this embodiment, the functions of the DM service unit 112 and the AS service unit 113 are realized by the control unit 103 illustrated in FIG. 1A.

In a case where the control unit 103 realizes the function of the DM service unit 112, the control unit 103 functions as first processing means which executes a command based on the DM service (the first communication procedure) issued by the client apparatus 200 on the imaging apparatus 100. In a case where the control unit 103 realizes the function of the AS service unit 113, the control unit 103 functions as second processing means which executes a command based on the AS service (the second communication procedure different from the first communication procedure) issued by the client apparatus 300 on the imaging apparatus 100.

The DM service unit 112 executes a command based on the DM service performed by the client apparatus 200 on the imaging apparatus 100. The command based on the DM service includes a command for setting a public key (first public key information) used to perform encrypted communication to the imaging apparatus 100 and a command for setting a private key (first private key information) corresponding to the first public key information to the imaging apparatus 100. The command based on the DM service further includes a command for setting a certificate (first certificate information) indicating that the public key is valid key information to the imaging apparatus 100. It is not necessarily the case that the DM service unit 112 executes all the commands, and the DM service unit 112 executes at least one of the commands.

The AS service unit 113 executes a command based on the AS service performed by the client apparatus 300 on the imaging apparatus 100. The command based on the AS service includes a command for setting key pair information indicating that a public key (second public key information) used to perform encrypted communication corresponds to a private key (second private key information) to the imaging apparatus 100. The command based on the AS service further includes a command for setting a certificate (second certificate information) indicating that the public key is valid key information to the imaging apparatus 100. The command based on the AS service further includes a command for setting a certification path (certification path information) indicating another certificate information associated with the certificate to the imaging apparatus 100. It is not necessarily the case that the AS service unit 113 executes all the commands, and the AS service unit 113 executes at least one of the commands.

The keystore unit 114 is a database which stores Keystore information of Keystore defined in the advanced security of the ONVIF. In this embodiment, a function of the keystore unit 114 is realized by the recording unit 104 illustrated in FIG. 1A. The keystore unit 114 includes the following recording units.

Keypair unit 115: KeyID (a key ID) which uniquely indicates a private key (Privatekey), a public key (Publickey), Alias to which an arbitrary character string is set by a client, and Keypair which are associated with one another is recorded.

Certificate unit 116: CertificateID (a certificate ID) information which uniquely indicates a certificate (Certificate), Alias, and KeyID of Keypair in which a public key of the certificate is stored which are associated with one another is recorded.

Certificationpath unit 117: CertificationPathID (Certification path ID) information which uniquely indicates a certification path ID, Alias, and a certification path (CertificationPath) which are associated with one another is recorded. The certification path ID (CertificationPathID) indicates order of a plurality of certificates by at least one CertificateID.

The certification path indicates order of reference of certificates performed by the imaging apparatus 100 for encrypted communication and a hierarchical structure of the plurality of certificates. For example, in SSL communication or the like, to prove that a first certification authority which has issued a first certificate is reliable, a second certification authority issues a second certificate. Furthermore, to prove that the second certification authority is reliable, a root certification authority issues a third certificate. In this example, the first to third certificates constitute the hierarchical structure. The certification path is information indicating such a hierarchical structure of certificates. Although the case where the hierarchical structure has three layers of certificates is described in the foregoing example, the number of layers is not limited to three and an arbitrary number of layers may be employed. The imaging apparatus 100 refers to the first certificate if performing encrypted communication using a certificate. Subsequently, the imaging apparatus 100 refers to a signature of the certification authority included in the first certificate and refers to the second certificate. Furthermore, the imaging apparatus 100 refers to a signature of the certification authority included in the second certificate and refers to the third certificate. In this way, the imaging apparatus 100 refer to the first to third certificates in this order. Although the order of the three certificates has been described in the foregoing example, the number of certificates is not limited and an arbitrary number of certificates may be employed.

Each of the keypair unit 115, the certificate unit 116, and the certificationpath unit 117 has a recording region (Alias) used to record an arbitrary character string.

A process of setting a public key, a private key, and a certificate to the imaging apparatus 100 by the client apparatus 200 on the basis of the DM service will now be described with reference to FIGS. 2A and 2B. The public key, the private key, and the certificate are required to be recorded in advance in the imaging apparatus 100 before the imaging apparatus 100 and the client apparatus 200 perform security communication using the HTTPS.

First, a process performed by the client apparatus 200 will be described with reference to a flowchart of FIG. 2A. A determination process illustrated in FIG. 2A may be executed by the client apparatus 200 in response to a user's command. Alternatively, the control unit 202 reads and executes the program stored in the recording unit 203 so as to execute the process illustrated in the flowchart of FIG. 2A.

The client apparatus 200 obtains information on a status indicating whether a hypertext transfer protocol secure (HTTPS) service is enabled in the imaging apparatus 100 (S201).

The status in which a setting by the HTTPS is enabled is a status in which HTTPS communication using the SSL, the transport layer security (TLS), or the like may be started. Specifically, a public key, a private key, and a certificate which are to be used in the HTTPS communication have been set in the imaging apparatus 100.

On the other hand, a status in which a setting by the HTTPS is disabled is a status in which a public key, a private key, and a certificate which are to be used in the HTTPS communication have not been set in the imaging apparatus 100. The status in which a setting by the HTTPS is disabled includes, for example, a status in which a certificate is expired, discarded, or temporarily unavailable, and therefore, the HTTPS communication may not be performed using the certificate.

In step S201, the client apparatus 200 transmits a GetNetworkProtocols command to the imaging apparatus 100. By transmitting the GetNetworkProtocols command, the client apparatus 200 requests an obtainment of information on statuses of services of the HTTP, the HTTPS, and the real time streaming protocol (RTSP) provided by the imaging apparatus 100. The status information includes information indicating that each of the services is enabled or disabled. Furthermore, the client apparatus 200 requests an obtainment of information on port numbers used by the services by the GetNetworkProtocols command. The imaging apparatus 100 transmits a GetNetworkProtocols response to the client apparatus 200.

Next, the client apparatus 200 checks the GetNetworkProtocols response and determines whether a setting by the HTTPS is enabled (S202). If the setting of the HTTPS is disabled (No in step S202), the process proceeds to step S207 described below.

If the setting by the HTTPS is enabled (Yes in step S202), the client apparatus 200 determines whether the existing setting by the HTTPS is to be used or a setting by the HTTPS is to be newly performed (S203). If the existing setting by the HTTPS is to be used (Yes in step S203), the setting of a public key, a private key, and a certificate to the imaging apparatus 100 currently performed is terminated.

On the other hand, a setting by the HTTPS is to be newly performed (No in step S203), the client apparatus 200 obtains all certificates included in the imaging apparatus 100 (S204).

In step S204, the client apparatus 200 transmits a GetCertificates command to the imaging apparatus 100. The imaging apparatus 100 transmits a GetCertificates response to the client apparatus 200. The GetCertificates command is issued by the client apparatus 200 so as to request an obtainment of information indicating all the certificates included in the imaging apparatus 100.

As the GetCertificates response, certificates (Certificates) included in the imaging apparatus 100 are obtained. The client apparatus 200 determines whether a selected one of the obtained certificates is to be used or a certificate is to be newly generated (S205). The determination in step S205 may be made in accordance with a command for determining a certificate to be used issued by the user.

If a selected one of the certificates obtained from the imaging apparatus 100 is to be used for the HTTPS communication (Yes in step S205), the client apparatus 200 sets the selected certificate to the imaging apparatus 100 (S206). For the setting of the certificate, a SetCertificatesStatus command may be used. The SetCertificatesStatus command is a command for recording setting information used for encrypted communication in the recording unit 104. The SetCertificatesStatus command is a command issued on the basis of the DM service (the first communication procedure) by the client apparatus 200 to the imaging apparatus 100.

In step S205, if it is determined that a certificate is to be newly generated (No in step S205), the client apparatus 200 determines whether a public key, a private kay, and a certificate are to be newly generated in the imaging apparatus 100 (S207).

If a public key, a private key, and a certificate are to be newly generated in the imaging apparatus 100 (Yes in step S207), the client apparatus 200 instructs the imaging apparatus 100 to generate a public key, a private kay, and a self signed certificate. The self signed certificate is referred to as "SelfSignedCertificate" where appropriate.

The client apparatus 200 requests the imaging apparatus 100 to generate a public key and a private key by a CreateCertificate command and requests the imaging apparatus 100 to generate a self signed certificate using the public key and the private key.

If it is determined that a public key, a private key, and a certificate are not to be newly generated in the imaging apparatus 100 (No in step S207), the client apparatus 200 generates a public key, a private kay, and a certificate therein (S210). Then the client apparatus 200 loads the generated private key and the generated certificate in the imaging apparatus 100 using a LoadCertificateWithPrivateKey command (S211). A process of loading the private key and the certificate from the client apparatus 200 to the imaging apparatus 100 will be described in detail hereinafter with reference to FIG. 4.

After the process in step S209 or the process in step S211 is completed, the client apparatus 200 performs a setting to the imaging apparatus 100 such that the generated public key, the generated private key, and the generated certificate are to be used for the HTTPS communication.

The client apparatus 200 obtains status information indicating whether the certificate is available for the HTTPS communication using a GetCertificatesStatus command. At a time when the certificate is generated using the CreateCertificate command, a setting for using the generated certificate in the HTTPS communication has not been performed. Therefore, the client apparatus 200 transmits a SetCertificatesStatus command to the imaging apparatus 100 so as to set True to Status. In this way, the setting for using the generated certificate in the HTTPS communication may be performed.

A SetNetworkProtocols command is used to set enabling/disabling statuses of the HTTP service, the HTTPS service, and the RTSP service and port numbers of the services. If the HTTPS is enabled, the imaging apparatus 100 performs a setting of the HTTP server unit 111 such that a certificate in which Status thereof is True is to be used for the HTTPS communication.

Figure 2A:
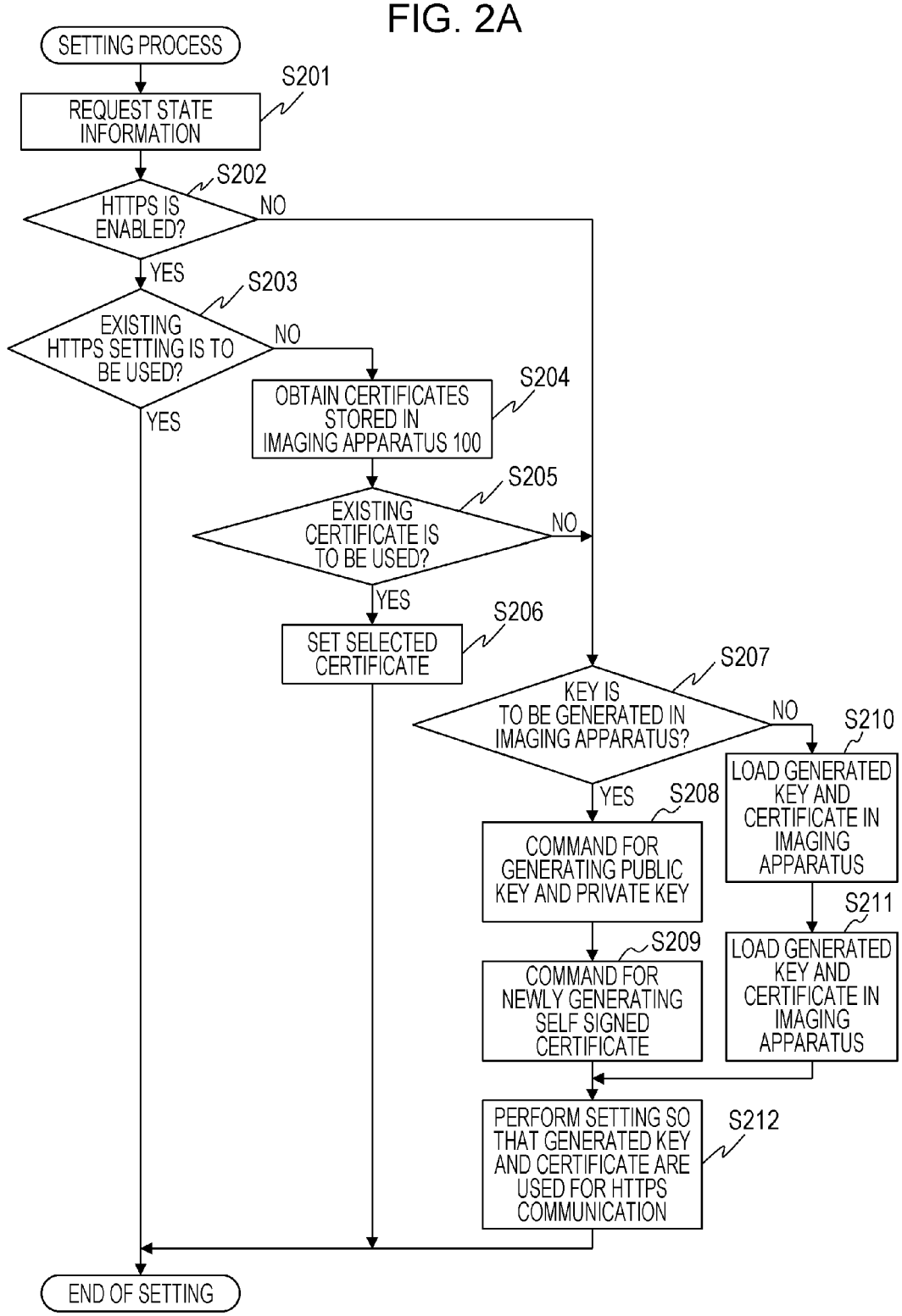
Figure 2B:
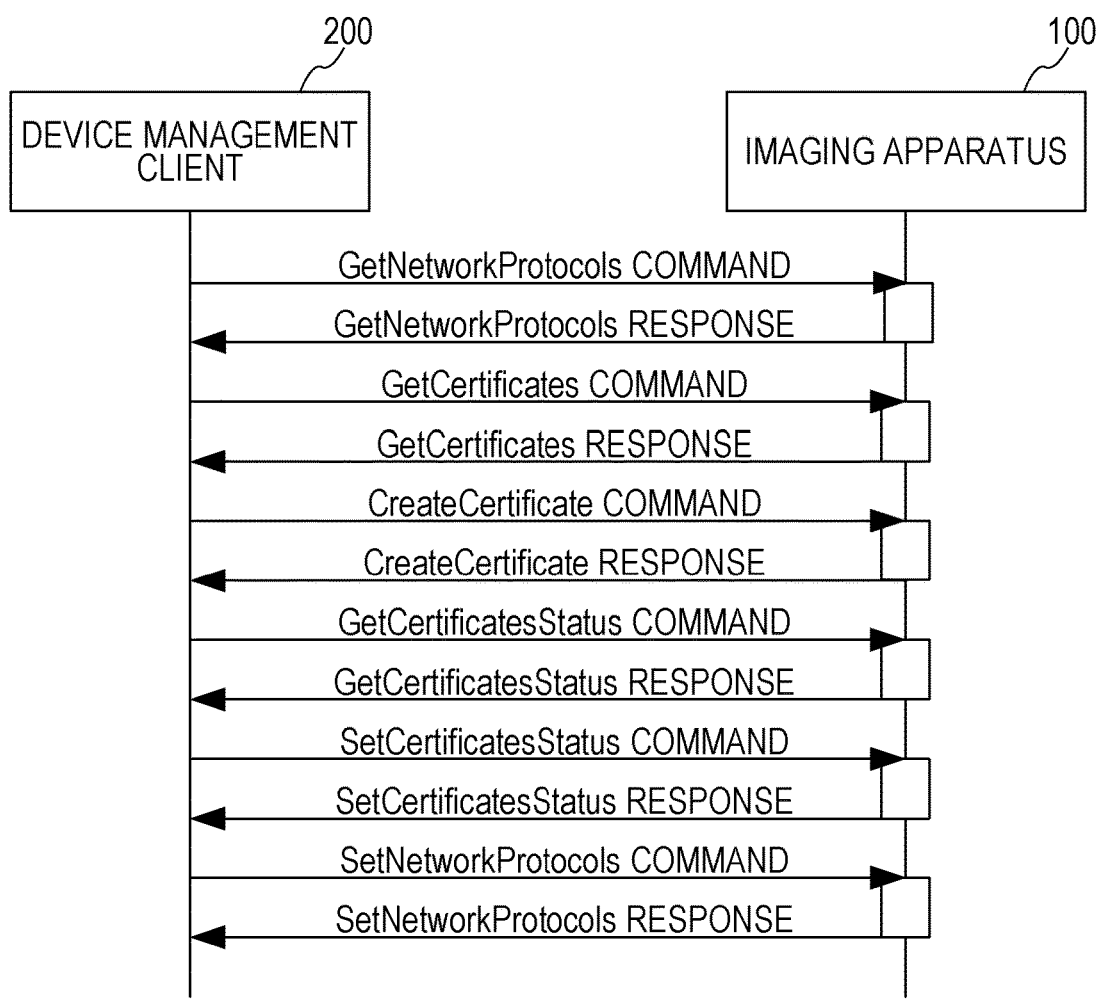

Note that a sequence of a setting for performing the HTTP communication between the imaging apparatus 100 and the client apparatus 200 is illustrated in FIG. 2B. In this way, the client apparatus 200 performs the setting to the imaging apparatus 100 on the basis of the DM service.

On the other hand, if the client apparatus 300 performs a setting for the HTTPS communication on the basis of the AS service, the client apparatus 300 sets a key pair (KeyPair), a certificate (Certificate), and a certification path (CertificationPath) to the imaging apparatus 100. The client apparatus 300 sets a certification path used for the HTTPS communication to the imaging apparatus 100 using an AddServerCertificateAssignment command. The key pair and the certification path are concepts of the AS service which are not included in the DM service.

Here, in a case where the client apparatus 300 performs a setting for the HTTPS communication on the imaging apparatus 100 using the AS service, and thereafter, the client apparatus 200 starts a setting for the HTTPS communication on the imaging apparatus 100 using the DM service, the following operation is performed.

For example, after the client apparatus 300 performs the setting, the client apparatus 200 executes the GetNetworkProtocols command in step S201 of FIG. 2A so as to check whether a setting for the HTTPS has been made on the imaging apparatus 100. In this case, since the setting for the HTTPS has been enabled by the client apparatus 300, the imaging apparatus 100 transmits information indicating that the setting for the HTTPS communication is enabled (Enable) to the client apparatus 200 as a response. Specifically, information indicating that the public key, the private key, and the certificate to be used in the HTTPS communication have been set in the imaging apparatus 100 is transmitted as a response.

However, even if the client apparatus 200 requests a certificate in step S204, the certificate set by the client apparatus 300 is not transmitted to the client apparatus 200. This is because the certificate set in the imaging apparatus 100 using the command of the AS service may not be transmitted as a response to the GetCertificates command of the DM service.

Accordingly, a user of the client apparatus 200 may be confused since the user may not recognize a reason that, although the certificate has been set in the imaging apparatus 100, the certificate may not be transmitted in response to the certificate requesting command.

Furthermore, even if the client apparatus 200 executes the GetCertificatesStatus command in step S212, a certificate having an empty status is transmitted to the client apparatus 200. This is because the DM service does not have the concepts of the certification path and the key pair of the AS service, and accordingly, nothing may be transmitted as a response to the GetCertificatesStatus.

Furthermore, since the DM service does not have a concept of CACertificate (an intermediate certificate, a CA certificate, or a cross root certificate) which may be set in the AS service, a setting thereof may not be indicated in the DM service.

In addition, in the case where the client apparatus 200 performs the setting for the HTTPS communication based on the DM service, since the AS does not have a concept of Status of a certificate, content of the setting made on the basis of the DM service may not be referred to by the AS service.

Accordingly, the imaging apparatus 100 of this embodiment uses prescribed Keystore as the AS service so that consistency between content of the setting of the imaging apparatus 100 which is referred to by the client apparatus 200 and the setting of the imaging apparatus 100 which is referred to by the client apparatus 300 is ensured. A detailed configuration which ensures the consistency between the setting of the imaging apparatus 100 referred to by the client apparatus 200 and the setting of the imaging apparatus 100 referred to by the client apparatus 300 will be described with reference to a flowchart of FIG. 3.

FIG. 3 is a flowchart illustrating a process executed by the imaging apparatus 100. In a mode in which the control unit 103 of the imaging apparatus 100 incorporates a processor and a memory, the process illustrated in FIG. 3 is realized when the control unit 103 executes a procedure illustrated in FIG. 3 by developing a program stored in the recording unit 104. Alternatively, a portion of the process or the entire process illustrated in FIG. 3 may be performed by hardware.

FIG. 3 is a flowchart illustrating a process performed by the DM service unit 112 when the CreateCertificate command is issued as illustrated in FIG. 2A. The CreateCertificate command is issued so that the client apparatus 200 instructs the imaging apparatus 100 to generate a certificate.

The imaging apparatus 100 receives a command for instructing generation of a certificate from the client apparatus 200 (S301). In this embodiment, in step S301, the imaging apparatus 100 receives the CreateCertificate command from the client apparatus 200.

In this embodiment, a case where the client apparatus 200 sets the following content to the imaging apparatus 100 in step S301 will be described.
CertificateID 123456
Subject CN=sample.com
ValidNOtBefore 01-01-2015T01:00:00Z
ValidNOtAfter 12-31-2020T23:59:59Z If receiving the CreateCertificate command through the HTTP server unit 111, the DM service unit 112 generates a public key and a private key (S302). According to a CreateRSAKeyPair command of the AS service, a key length of RSA may be set by specifying Keylength. However, such a setting may not be performed by the CreateCertificate command of the DM service, and therefore, the keys are generated with a fixed key length of 2048 bits, for example.

Subsequently, the DM service unit 112 generates a self signed certificate using the generated public key and the generated private key (S303). The self signed certificate is certificate information which proves that the public key is valid key information, and sign information is added by the DM service unit 112 to the certificate information. In the specification of the DM service, Subject is a string type and a method for setting a country name (Country) and a common name (CommonName) is not defined. In this embodiment, the common name is set after "CN=". A character string "sample.com" after "CN=" is set to Subject and Issuer of the self signed certificate, "ValidNOtBefore" is set as a starting date of a validity period, and "ValidNOtAfter" is set as an ending date of the validity period.

Next, content of the setting is recorded in the keypair unit 115 of the keystore unit 114 (S304). In step S304, the public key, the private key, and the self signed certificate are stored in the keypair unit 115. Furthermore, in step S304, a unique character string which has not been recorded in the keypair unit 115 is generated as KeyID (key pair information) and is stored in the keypair unit 115. KeyID is associated with the generated public key and the generated private key in step S304 and indicates that the public key and the private key correspond to each other. Furthermore, in step S304, information indicating that the key pair information has been generated in response to the command based on the DM service is recorded in Alias of the keypair unit 115. The information recorded in Alias of the keypair unit 115 may be a character string, such as "ONVIFDeviceManagement".

In this way, the key pair information which is not included in the DM service as a concept may be automatically generated in response to a command for generating a certificate provided by the DM service. Furthermore, information indicating that the key pair information has been generated in response to the command of the DM service may be recorded in the recording unit 104.

Similarly, in step S304, a character string indicating that the self signed certificate has been generated in response to the command of the DM service is recorded in Alias of the keypair unit 115.

Next, content of the setting is recorded in the certificate unit 116 of the keystore unit 114 (S305). In step S305, the generated self signed certificate is stored in the certificate unit 116. Furthermore, in step S305, a unique character string which has not been included in the certificate unit 116 is generated as CertificateID to be recorded in the certificate unit 116. Furthermore, in step S305, a character string indicating that the setting associated with the HTTPS has been set to the imaging apparatus 100 in response to the command of the DM service is recorded in Alias of the certificate unit 116. Moreover, in step S305, KeyID recorded in the keypair unit 115 is also stored in the certificate unit 116 so that the information recorded in the certificate unit 116 and the information recorded in the keypair unit 115 are associated with each other.

Next, content of the setting is recorded in the certificationpath unit 117 of the keystore unit 114 (S306). If a certificate is generated in response to the CreateCertificate command, a self signed certificate is used, and therefore, the number of layers of hierarchy is 1. Therefore, in step S306, only CertificateID generated in step S305 is set to the certificationpath unit 117 as CertificationPathID. Furthermore, information indicating that the certification path information has been generated in response to the command of the DM service in Alias of the certificationpath unit 117 is recorded in the recording unit 104.

In this way, the certification path information which is not included in the AS service as a concept may be automatically generated in response to the command for generating a certificate provided by the DM service. Furthermore, information indicating that the certification path information has been generated in response to the command of the DM service may be recorded in the recording unit 104.

Finally, CertificateID generated in step S305 and the self signed certificate are assigned to CertificateID and Certificate which are included in a response to CereateCertitificate. Then CertificateID and the self signed certificate are transmitted to the client apparatus 200 (S307).

In this way, the client apparatus 300 may refer to the public key and the private key which are set by the client apparatus 200 to the imaging apparatus 100 as Keypair. In this embodiment, the client apparatus 300 transmits a GetAllKeys command to the imaging apparatus 100 so as to refer to Keypair. The character string indicating that the public key and the private key have been set in response to the command of the DM service has been recorded in Alias of the keypair unit 115. The content of Alias is transmitted from the imaging apparatus 100 to the client apparatus 300 as a response to the GetAllKeys command. Accordingly, the user of the client apparatus 300 may recognize that the public key and the private key have been set in the imaging apparatus 100 by the client apparatus 200 which employs the DM service.

Furthermore, the character string indicating that the certificate and the certification path have been set in response to the command of the DM service is described in Alias of the certificate unit 116. The content of Alias is transmitted from the imaging apparatus 100 to the client apparatus 300.

Accordingly, the user of the client apparatus 300 may recognize that the certificate and the certification path have been set by the client apparatus 200 which employs the DM service. The client apparatus 300 specifies CertificationPathID by an AddServerCertificateAssignment commend so that the self signed certificate generated by the client apparatus 200 is to be used in the HTTPS communication.

Next, a process performed by the imaging apparatus 100 when the private key and the certificate are loaded from the client apparatus 200 to the imaging apparatus 100 in the process of step S211 illustrated in FIG. 2A will be described with reference to FIG. 4. The process illustrated in FIG. 4 is executed by the imaging apparatus 100. In a mode in which the control unit 103 of the imaging apparatus 100 incorporates a processor and a memory, the process illustrated in FIG. 4 is realized when the control unit 103 executes a procedure illustrated in FIG. 4 by developing a program stored in the recording unit 104. Alternatively, a portion of the process or the entire process illustrated in FIG. 4 may be performed by hardware.

The imaging apparatus 100 receives a command (LoadCertificates) for loading a certificate from the client apparatus 200 (S401). The LoadCertificates command includes the flowing content.

CertificateID: CertificateID specified when a certificate signing request (CertificateSigningRequest: CSR) is generated by GetPkcs10Request Certificate: a certificate signed (Sign) by a certification authority (CertificationAuthority: CA)

If receiving the LoadCertificates command, the DM service unit 112 obtains the information (Keypair information) stored in the keypair unit 115 of the keystore unit 114 (S402). Subsequently, the DM service unit 112 obtains a public key from the certificate unit 116 (S403).

As for the self signed certificate generated by the imaging apparatus 100 in response to the CreateCertificate command, a public key and a private key are stored in the keypair unit 115 of the keystore unit 114. Similarly, the certificate signed in response to the certificate signing request (CertificateSigningRequest: CSR) generated on the basis of CertificateID of the self certificate has an associated key pair. The imaging apparatus 100 determines whether one of public keys recorded in the keypair unit 115 matches the public key obtained in step S403 (S404).

If any of the public keys recorded in the keypair unit 115 of the keystore unit 114 does not match the public key in the certificate unit 116 (No in step S404), the certificate may not be used, and accordingly, an error process is performed (S410).

On the other hand, if one of the public keys recorded in the keypair unit 115 of the keystore unit 114 matches the public key in the certificate unit 116 (Yes in step S404), a certification path including specified CertificateID is deleted (S405). In this way, the certification path set for the self signed certificate may be deleted.

Next, a certificate having CertificateID indicated by the information recorded in the certificate unit 116 of the keystore unit 114 is deleted (S406). Subsequently, a certification path including the certificate loaded from the client apparatus 200 is set. In addition to the loaded certificate, Alias indicating that the setting has been performed in response to the command of the DM service is stored in the certificationpath unit 117 of the keystore unit 114 (S407). Thereafter, a certification path to which CertificateID is set is generated. Then unique CertificationPathID and Alias indicating that the setting has been performed using the DM service are stored in the certificationpath unit 117 of the keystore unit 114.

Since the LoadCertificates command may specify a plurality of certificates to be loaded, it is determined whether another certificate is to be loaded (S409). If it is determined that another certificate is to be loaded (Yes in step S409), the process returns to step S403. When all certificates have been processed (No in step S409), a response to the LoadCertificates command is transmitted to the client apparatus 200 (S411).

At this point, the certificate loaded by the client apparatus 200 may be set as a certificate to be used when encrypted communication is performed by the client apparatus 300 with the imaging apparatus 100 in accordance with the following procedure. Specifically, if the client apparatus 300 specifies CertificationPathID by the AddServerCertificateAssignment command, the certificate may be used in the HTTPS communication (the SSL, for example).

If the DM service unit 112 processes a LoadCACertificates command, a private key of CACertificate is not included in the keypair unit 115 of the keystore unit 114. Therefore, a key pair is obtained from the keystore unit 114. Then a key pair in which the public key of the loaded certificate and the private key stored in the keypair unit 115 matches each other may be determined as an error. If the matching is not detected, the public key obtained from the certificate unit 116 and unique KeyID are stored in the keypair unit 115 of the keystore unit 114, and information indicating that the setting has been performed in response to the command of the DM service is set in Alias thereof. Furthermore, the certificate and the unique CertificateID are stored in the certificate unit 116 of the keystore unit 114, and information indicating that the setting has been performed in response to the command of the DM service is set to Alias thereof.

Next, a process performed when the imaging apparatus 100 receives the GetCertificates from the client apparatus 200 will be described with reference to FIG. 5. The process in FIG. 5 is realized by the DM service unit 112 illustrated in FIG. 2B.

If receiving the GetCertificates from the client apparatus 200 (S501), the DM service unit 112 obtains a key pair and a certificate from the keystore unit 114 (S502).

Subsequently, the DM service unit 112 refers to the keypair unit 115 associated with the obtained certificate so as to determine whether a private key is included in the keypair unit 115 (S503). If a private key is detected (Yes in step S503), the certificate is added to NVTCertificate serving as a response (S504).

If a private key is not included in the keypair unit 115 (No in step S503), the certificate is not included in the response. This is because, if a private key is not included, CACertificate may be detected.

In a case where a plurality of certificates are obtained in step S502, it is determined whether each of the certificates is to be included in the response (S505). If a next certificate exists, a process in step S503 onwards is performed again. When the determination is performed on all Certificates (No in step S505), the response is transmitted to the client apparatus 200 (S506).

In a case where a GetCACertificates command is processed in the DM service unit 112, the certificate in which a negative determination is made in step S503 of FIG. 5 may be transmitted as a response since CACertificate does not have a private key.

Figure 6:
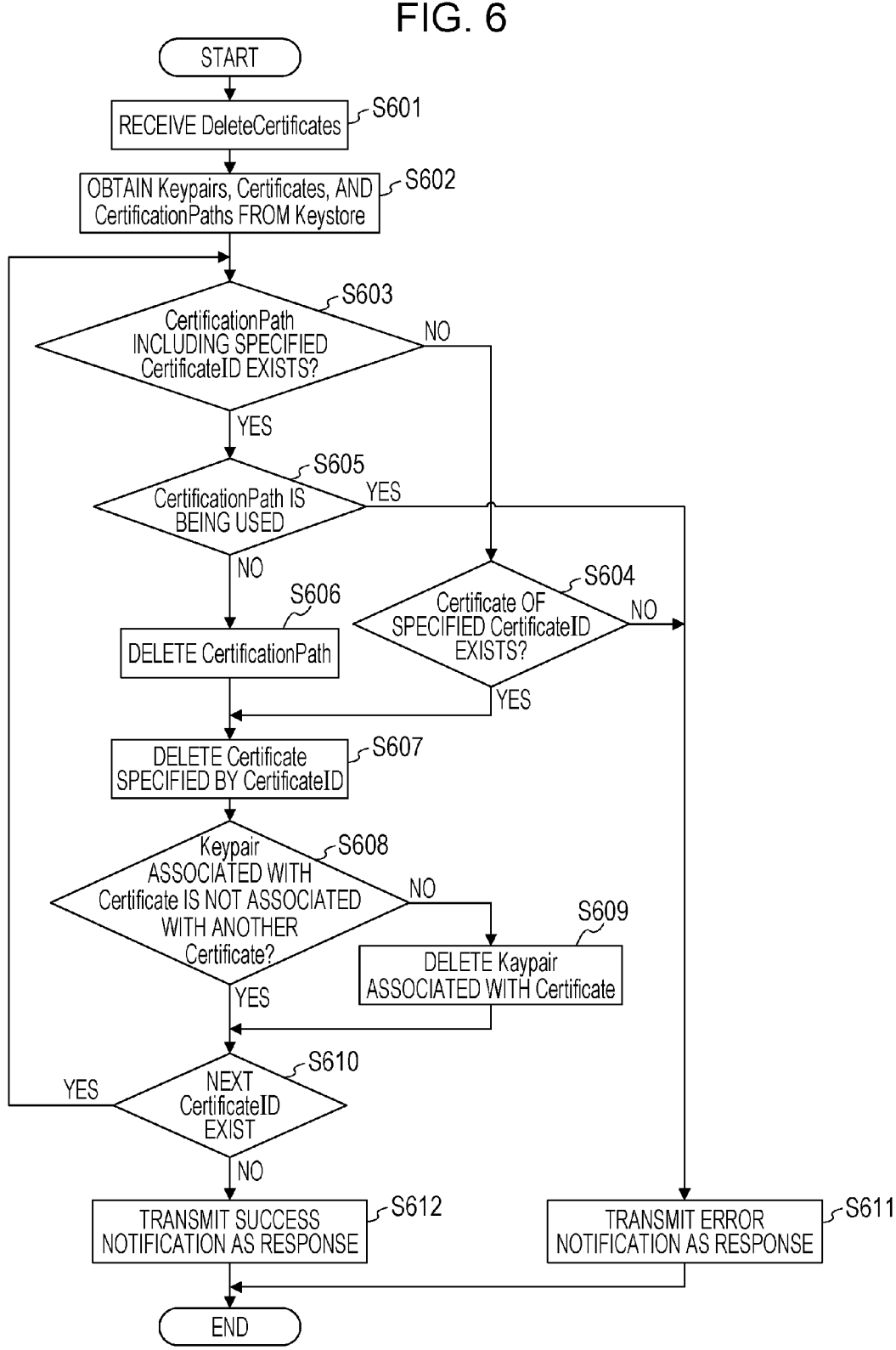
FIG. 6 is a flowchart illustrating a process of deleting the certificate.

FIG. 6 is a flowchart illustrating the process of deleting a certificate performed by the DM service unit 112. Commands associated with security of the DM service do not have concepts of a certification path (CertificationPath) and a key pair (Keypair). In this embodiment, in a case where a certificate is deleted by a DeleteCertificates command based on the DM service, a certification path and a key pair based on the AM service are also deleted.

The DeleteCertificates command is issued on the bases of the DM service to request deletion of certificate information recorded in the recording unit 104. Although a process of deleting a certificate is described in this embodiment, a certificate may be disabled. An old certificate may be disabled by being replaced by a new certificate.

If receiving the DeleteCertificates command (S601), the DM service unit 112 obtains key pairs, certificates, and certification paths from the keystore unit 114 (S602).

Subsequently, it is determined whether a certification path including CertificateID specified by the DeleteCertificates command is included (S603). If such a certification path is not included (No in step S603), a certification path of a certificate specified by CertificateID is not required to be deleted. It is determined whether a certificate having the same CertificateID is included in the certificate unit 116 of the keystore unit 114 (S604). If such a certificate is not included, that is, a specified certificate is not included, the AS service unit 113 transmits an error notification to the client apparatus 200 as a response (S611). If such a certificate is included, Certificate corresponding to specified CertificateID is deleted (S607).

If it is determined that the certification path including the specified CertificateID is included in step S603 (Yes in step S603), it is determined whether the certification path is being used in the SSL or the like. If the certification path is being used (Yes in step S605), the certificate may not be deleted, and therefore, the AS service unit 113 transmits an error notification to the client apparatus 200 as a response (S611).

If the certification path is not being used (No in step S605), the certification path is deleted (S606) and the certificate specified by CertificateID is deleted (S607). Thereafter, a key pair associated with the certificate is deleted. A key pair may not be deleted by any security command of the DM service, and therefore, the kay pair is required to be deleted by the DeleteCertificates command.

However, since the key pair may be associated with another certificate, it is determined whether the key pair is associated with another certificate in step S610. If the key pair is not associated with another certificate (No in step S608), the key pair associated with the certificate which is a target of the deletion is deleted (S609). If the key pair is associated with another certificate (Yes in step S608), the key pair is not deleted. Since the DeleteCertificates command may specify a plurality of CertificateIDs, if next CertificateID exists (Yes in step S610), the deletion process is performed on next Certificate ID (the process returns to step S603). After all CertificateIDs have been processed (No in step S610), the DM service unit 112 transmits information indicating that the process has been successfully terminated to the client apparatus 200.

In this way, the DM service unit 112 deletes information on the key pair corresponding to information on the certificate specified by the DeleteCertificates command (a first command) from the recording unit 104. Furthermore, the DM service unit 112 deletes information on the certification path corresponding to the certificate specified by the DeleteCertificates command from the recording unit 104. As described above, the certificate may be disabled by being replaced by another one or adding information indicating disabling to the certificate.

Next, a process of setting a status of a certificate will be described. The SetCertificatesStatus command is a command performed on the basis of the DM service and is issued to specify a certificate used for the HTTPS communication, such as the SSL. Hereinafter, in the embodiment, encrypted communication using the SSL is taken as an example. In this embodiment, status information (Status) of a certificate is enabled (enable) so that a setting for using the certificate in the SSL may be made, and Status is disabled (disable) so that a setting for not using the certificate in the SSL may be made.

However, in the DM service, only Status of one certificate may be changed and the DM service does not have a certification path as a concept unlike the AS service, and therefore, certificates in multiple stages may not be specified. Accordingly, in this embodiment, in a case where CertificateID is specified by the SetCertificatesStatus command, the following two processes may be performed.

First, in a case where identification information of a certificate specified by the SetCertificatesStatus command matches identification information of a leading certificate in order of certificates indicated by a certification path, the certification path is used for a setting in the SSL. The identification information of the certificate is indicated as CertificateID in the ONVIF.

Second, the other of the processes is a process performed when a certification path in which identification information of a certificate which matches identification information of the certificate specified by the SetCertificatesStatus command is set as identification information of a leading certificate in the order of certificates has not been recorded in the recording unit 104. In this case, a setting is performed such that a certification path in a single stage is generated using a certificate corresponding to CertificateID specified by the SetCertificatesStatus command and is recorded in the recording unit 104 as a certification path to be used in the SSL. Individual methods for performing the processes will be described in detail hereinafter.

Figure 7:
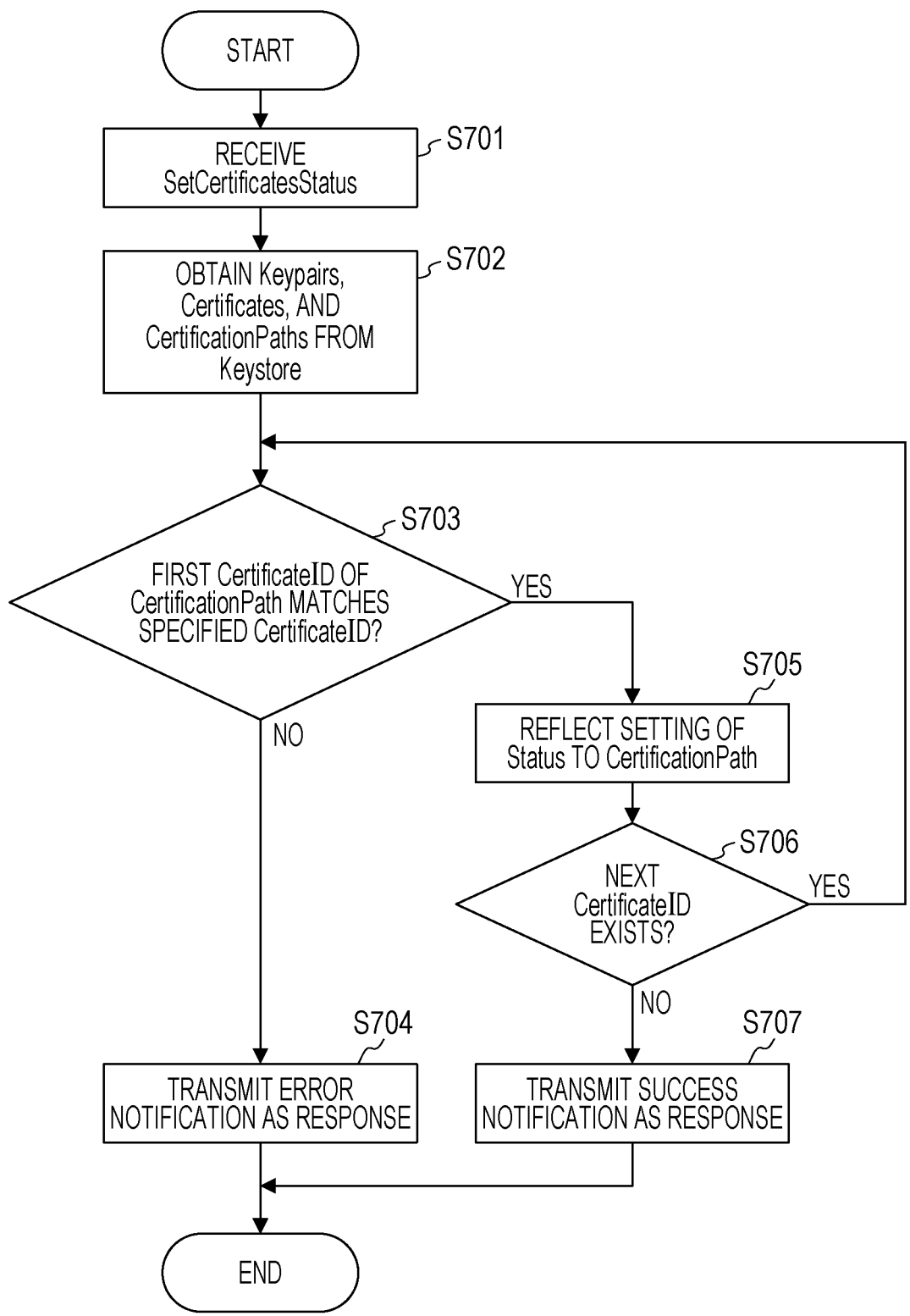
FIG. 7 is a flowchart illustrating a process of setting a status of the certificate.

Next, a process of executing the SetCertificatesStatus command in the DM service unit 112 will be described with reference to FIG. 7. In a flowchart of the process illustrated in FIG. 7, if the matching of CertificationID of the leading portion of the certification path is detected, a corresponding certification path is used for a setting of the SSL. If receiving the SetCertificatesStatus (S701), the DM service unit 112 obtains key pairs, certificates, and certification paths from the keystore unit 114 (S702). Subsequently, a certification path having leading CertificateID which matches the specified CertificateID is searched for (S703). If the matching is not detected (No in step S703), the DM service unit 112 transmits an error notification to the client apparatus 200 (S704). If the matching is detected (Yes in step S703) and if Status is True, the certification path is set to be used in the SSL whereas if Status is False, the certification path is set not to be used in the SSL (S705). Since the SetCertificatesStatus command may specify a plurality of CertificateIDs, if next CertificateID exists (Yes in step S706), a process returns to step S703 and the process in 5703 onwards is performed again. After all CertificateIDs have been processed (No in step S706), the DM service unit 112 transmits information indicating that the process has been successfully terminated to the client apparatus 200.

In this way, in a case where the client apparatus 300 sets a certification path including a plurality of CertificateIDs in advance, the client apparatus 200 may set the certification path including the plurality of CertificateIDs for the SSL.

Figure 8:
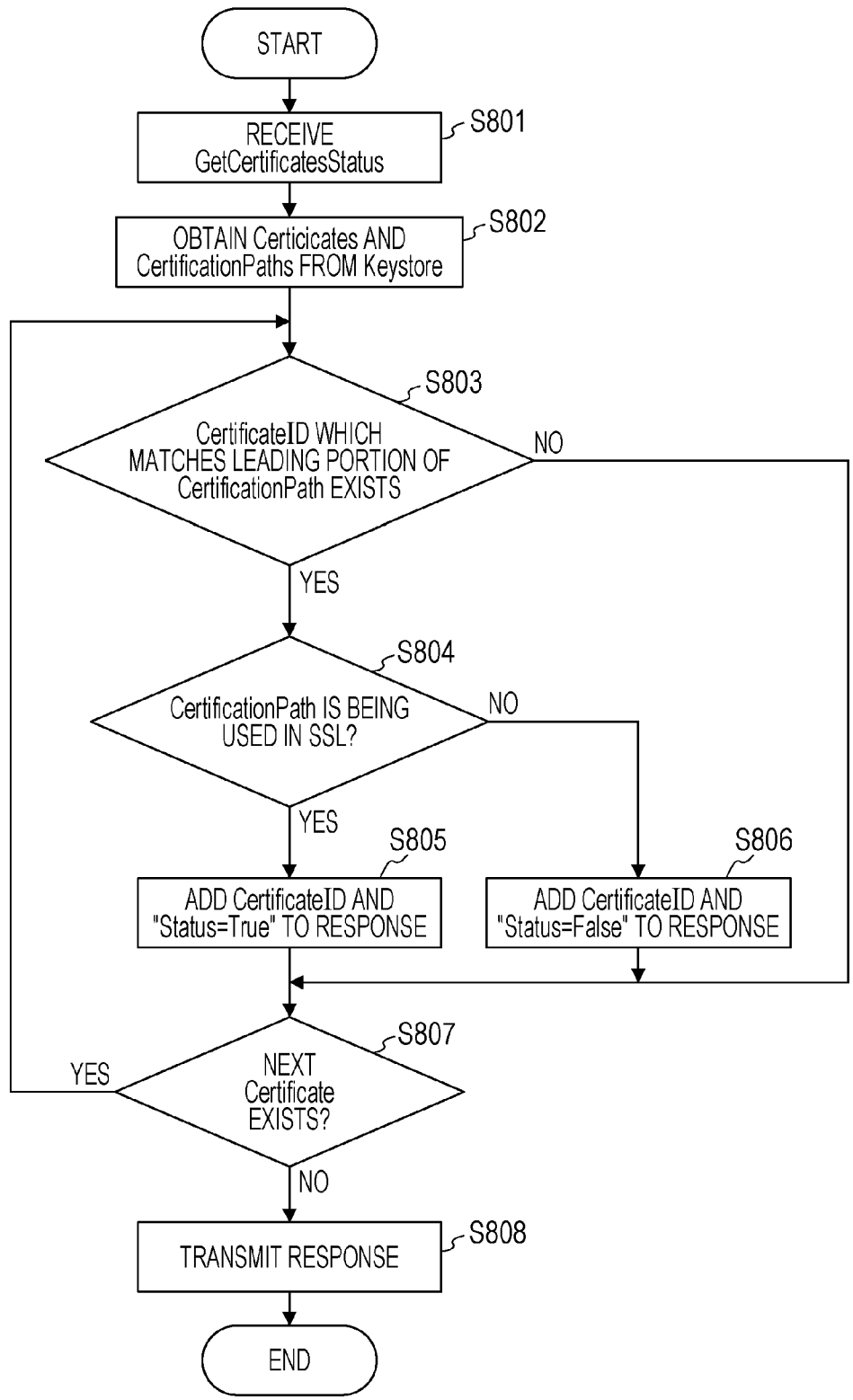
FIG. 8 is a flowchart illustrating a process of obtaining the status of the certificate.

Next, a process performed by the DM service unit 112 when the imaging apparatus 100 receives a GetCertificatesStatus command from the client apparatus 200 will be described with reference to FIG. 8. The GetCertificatesStatus command is a command based on the DM service. The GetCertificatesStatus command is a command for requesting transmission of information indicating a status of a certificate (information indicating whether the certificate may be used for the encrypted communication) recorded in the recording unit 104.

Referring to an example of FIG. 8, a case where a certification path having a leading certificate corresponding to CertificateID specified by the SetCertificatesStatus command is recorded in the recording unit 104 as a certification path used for a setting in the SSL will be described.

The GetCertificatesStatus command provided by the DM service returns Status of a single certificate, and therefore, may not indicate a certification path of the AS service. In certification path information based on the AS service, identification information (CertificateIDs) of a plurality of certificates are indicated. Therefore, in a case where the GetCertificatesStatus command based on the DM service is received, Status of one of the plurality of certificates is to be returned is to be determined. Therefore, in this embodiment, among the plurality of certificates indicated by the certification path, information (Status information, for example) on a leading certificate in order of reference performed by the imaging apparatus 100 for the encrypted communication is transmitted as a response.

If receiving the GetCertificatesStatus command (S801), the DM service unit 112 obtains certificates and certification paths from the keystore unit 114 (S802). If any of CertificateIDs of the certificates in the keystore unit 114 does not match leading CertificateID of the certification path (No in step S803), any certificate may not be used for a setting of the SSL. Therefore, nothing is added to a response to the GetCertificatesStatus command, and the process proceeds to step S807. If one of CertificateIDs of the certificates in the keystore unit 114 matches leading CertificateID of the certification path, it is determined whether the certification path is being used in the SSL (S804). If the certification path is being used in the SSL (Yes in step S804), CertificateID of interest and Status to which True is set are added to the response. If the certification path is not being used in the SSL (No in step S804), CertificateID of interest and Status to which False is set are added to the response. If another certificate exists, the process returns to step S803 for the response process (Yes in step S807). When all the certificates have been processed (No in step S807), the AS service unit 113 transmits the response to the client apparatus 200 (S808).

Figure 9:
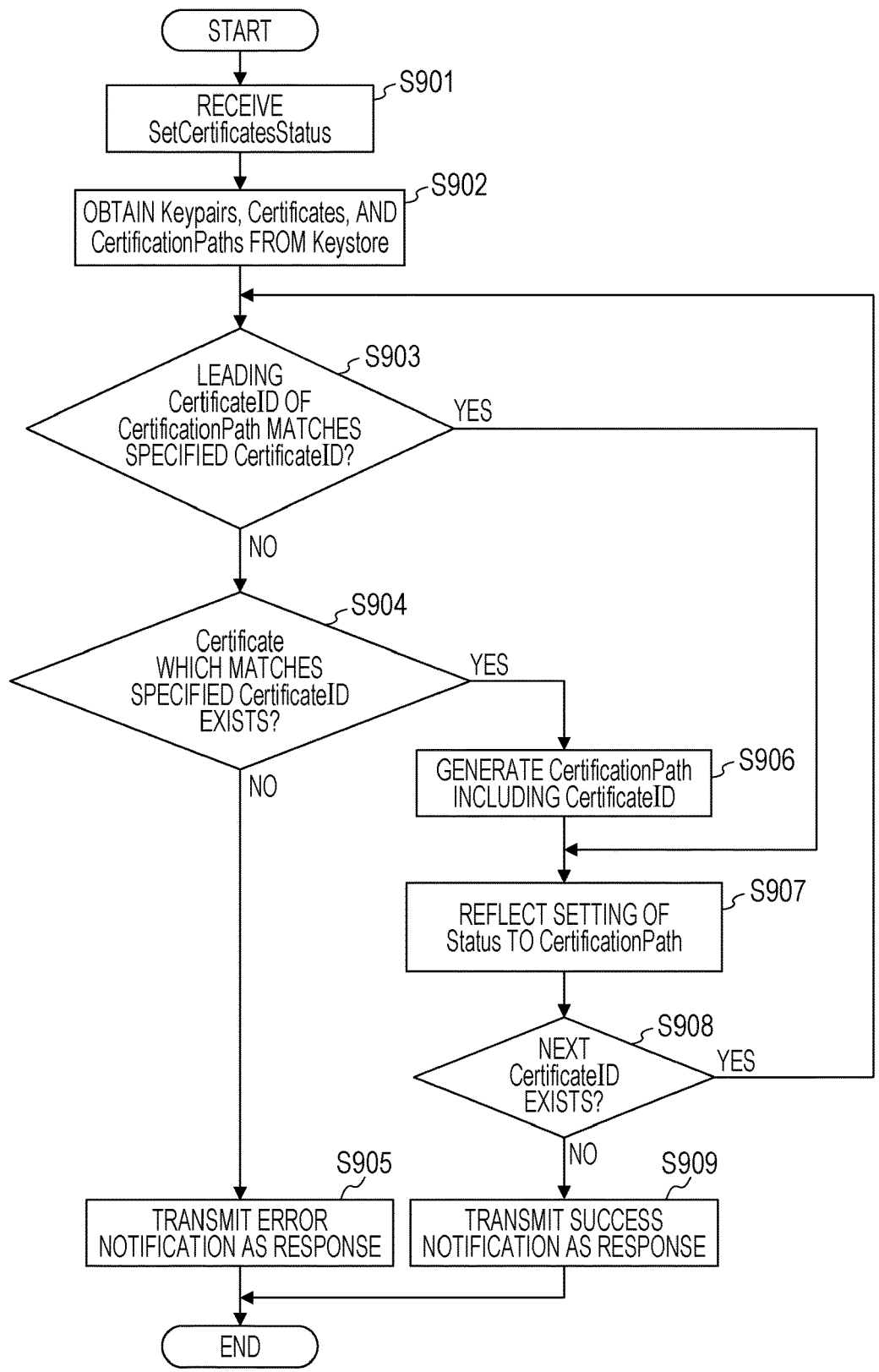
FIG. 9 is a flowchart illustrating a process of setting the status of the certificate.

FIG. 9 is a flowchart illustrating a process performed by the DM service unit 112 in response to the SetCertificatesStatus command. In the process illustrated in FIG. 9, if matching of CertificateID of a leading portion of a certification path is detected, the certification path is used for a setting of the SSL. On the other hand, if a setting of a certification path has not been made, a certification path of a single stage including a certificate corresponding to the specified CertificateID is generated and used for a setting of the SSL.

If receiving the SetCertificatesStatus command (S901), the DM service unit 112 obtains key pairs, certificates, and certification paths from the keystore unit 114 (S902). Subsequently, it is determined whether specified CertificateID matches leading CertificateID of one of the certification paths (S903). If the matching is detected (Yes in step S903), the certification path is used in the SSL if a value of specified Status is True, whereas the certification path is not used in the SSL if the value of specified Status is False.

If it is determined that a certification path including leading Certificate ID corresponding to specified CertificateID is not detected in step S903 (No in step S903), it is determined whether a certificate corresponding to specified CertificateID is included in the certificates in the Keystore unit 114 (S904). If the certificate is not detected, an error notification is transmitted as a response (S905).

If the determination is affirmative, a certification path in a single stage is generated using CertificateID (S906) and specified Status is reflected (S907). Since the SetCertificatesStatus command may specify a plurality of CertificateIDs, if next CertificateID exists (Yes in step S908), the process returns to step S903 and next CertificateID is processed. After all CertificateIDs have been processed (No in step S908), the DM service unit 112 transmits information indicating that the process has been successfully terminated to the client apparatus 200.

The DM service unit 112 according to this embodiment performs the following process so as to generate a certification path even if CertificateID which does not match leading portions of the certification paths is specified by the SetCertificatesStatus command. Specifically, CertificateID which does not match the leading portions of the certification paths is also transmitted in response to the GetCertificatesStatus command.

Figure 10:
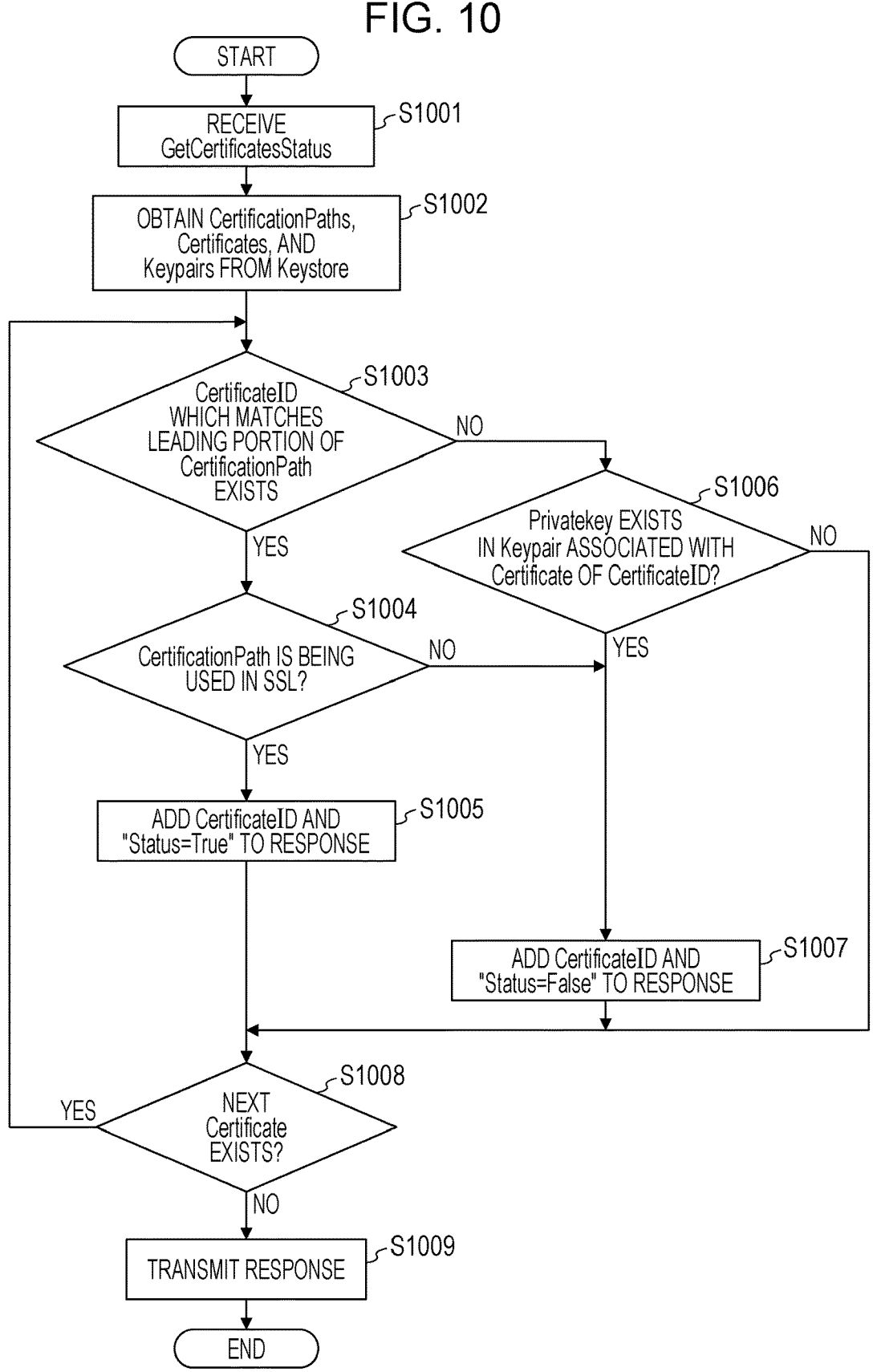
FIG. 10 is a flowchart illustrating a process of obtaining the status of the certificate.

Next, a process performed by the DM service unit 112 in response to the GetCertificatesStatus command will be described with reference to FIG. 10. In an example of FIG. 10, a case where a certificate and a certification path have been set in accordance with the process illustrated in FIG. 9 is described.

If receiving the GetCertificatesStatus command (S1001), the DM service unit 112 obtains certification paths, certificates, and key pairs from the keystore unit 114 (S1001). Subsequently, a certificate having CertificateID which is specified by the GetCertificatesStatus command and which matches leading CertificateID in order indicated by a certification path is searched for. If the matching is detected (Yes in step S1003), it is determined whether the certification path is being used in the SSL (S1004).

If the certification path is being used in the SSL (Yes in step S1004), CertificateID thereof is added to a response and Status thereof is set to True (S1005). If the certification path is not being used in the SSL (No in step S1004), CertificateID thereof is added to the response and Status thereof is set to False (S1007).

In this way, the DM service unit 112 processes a third command for requesting an obtainment of information indicating whether certificate information recorded in the recording unit 104 has been set as certificate information to be used for performing encrypted communication. Then, in accordance with the third command, information indicating that fourth certificate information indicating that certification path information is in a leading portion in the order is set as certificate information to be used for performing the encrypted communication (for example, Status is True) is recorded in the recording unit 104. Furthermore, the DM service unit 112 records information indicating that fifth certificate information different from the fourth certificate information is not set to be used for performing the encrypted communication (for example, Status is False) in the recording unit 104.

Subsequently, in a case where such CertificateID is not detected in the certificationpath unit 117 (No in step S1003), a certificate usable as a self signed certificate is generated as a response. A private key is set to a key pair associated with the certificate usable as a self signed certificate. If it is determined that a private key is included in the keypair unit 115 (Yes in step S1006), CertificateID of the certificate is added to a response, and Status thereof is set to False. If a private key is not included in the keypair unit 115 (No in step S1006), CertificateID thereof is not included in the response.

In this way, if the DM service unit 112 executes GetCertificatesStatus (the third command), information on certificates which are not associated with the key pair information, among the plurality of certificates indicated by the certification path, may not be transmitted.

Since the SetCertificatesStatus command may specify a plurality of CertificateIDs, if next CertificateID exists (Yes in step S1008), the process returns to step S1003 and next CertificateID is processed. After all CertificateIDs have been processed (No in step S1008), the DM service unit 112 transmits the response to the client apparatus 200.

A LoadCertificatesWithPrivatekey command is used to load a certificate, a private key, and public keys corresponding to the certificate and the private key in the imaging apparatus 100. If receiving this command, the DM service unit 112 obtains public keys individually from the certificate and the private key, and if matching is not detected, an error process is performed. If the matching is detected, the private key, the public key, and unique KeyID are stored in the keystore unit 114, and information indicating that the setting has been performed by the command of the DM service is set to Alias thereof. Furthermore, the certificate and CertificateID are stored in the certificate unit 116 of the keystore unit 114, and information indicating that the setting has been performed by the command of the DM service is set to Alias thereof.

As described above, in a case where the DM service unit 112 processes a command associated with security, settings of a key pair and a certification path may not be performed using commands associated with security of the DM. Therefore, in this embodiment, settings corresponding to a key pair, a certificate, and a certification path are recorded in the keystore unit 114. In this way, a setting state may be shared by the client apparatus 200 which uses security commands of the DM and the client apparatus 300 which performs settings using commands of the AS service.

Furthermore, if a key pair, a certificate, and a certification path are stored in the keystore unit 114, information indicating that the settings are performed on the basis of the DM service is recorded in Aliases. Then the communication unit 105 may transmit information indicating that the settings have been performed on the imaging apparatus 100 in accordance with the commands based on the DM service in accordance with a command based on the AS service (a command used to refer to the settings). In this way, even the client apparatus 200 performs security settings, the client apparatus 300 may recognize the settings.

The first embodiment of the present invention has been described hereinabove. However, the present invention is not limited to this embodiment and various modifications and changes may be made within the scope of the present invention. The communication unit 105 may record information indicating that a setting has been performed on the imaging apparatus 100 in accordance with a command based on the AS service and transmit the information in accordance with a command based on the DM service (a command used to refer to the setting). In this way, even if the client apparatus 300 performs security settings, the client apparatus 200 may recognize the settings.

Second Embodiment

An imaging apparatus having a function of setting a security function according to a second embodiment of the present invention will be described hereinafter with reference to FIGS. 11 to 15.

An imaging apparatus 100 according to this embodiment is capable of performing a setting on the imaging apparatus 100 using means other than a communication procedure of the ONVIF. In this embodiment, the imaging apparatus 100 serving as an information processing apparatus activates a WEB page to be used by a client apparatus 1100 to perform a setting on the imaging apparatus 100. A user may access a camera through a WEB browser using the client apparatus 1100 so as to change the setting.

Furthermore, in a case of a setting of the SSL, for example, the imaging apparatus 100 provides a WEB page for a setting in the SSL, and a setting of a certificate and control of start and end of an SSL service are performed using the WEB page. Hereinafter, the WEB page for a setting is referred to as a "setting page".

In this embodiment, the imaging apparatus 100 in which a function associated with security set in the setting page may be referred to by security commands of a DM service of the ONVIF and security commands of a AS service of the ONVIF will be described. Specifically, content of a setting performed by the client apparatus 1100 on the imaging apparatus 100 using the setting page may be checked by the client apparatuses 200 and 300 of the first embodiment.

In the ONVIF, a command group for setting a private key, a public key, and a certificate, a command group for performing a setting such that the private key, the public key, and the certificate are used in the SSL and the IEEE802.1X, and a command for setting start and end of a service are prescribed.

For example, although CertificateID is obtained when a certificate is generated or loaded, a usage of the certificate is not determined at that point. In a case of the SSL, the usage of the certificate is determined by a SetCertificatesStatus command among security commands used in the DM service. Furthermore, the usage of the certificate is determined by an Add/ReplaceServerCertificateAssignment command among commands used in the AS service.

In a case where a setting page suitable for a command for setting security of the ONVIF is to be provided, it is expected that different pages are used for setting a certificate and for applying the certificate to a service of the SSL or the like. In this case, the setting of a certificate is performed, and the certificate is specified in another page. However, if the setting of a certificate and start and stop of a service are completed in the setting page of the SSL, a user-friendly setting page is realized.

Furthermore, although a keystore unit 114 may set a plurality of certificates in general, in the case of the setting page of the SSL, it is sufficient that one certificate for an SSL server is set or one certificate for the SSL server and a pair of certificates in an intermediate layer are set.

In this embodiment, a case where an SSL setting is performed on the imaging apparatus 100 capable of performing a setting using the setting page is described as an example. In particular, a method for mutually reflecting the setting page, a setting of a security command of the DM service, and a setting of a command of the AS service using Alias of the keystore unit 114 will be described.

Figure 11:
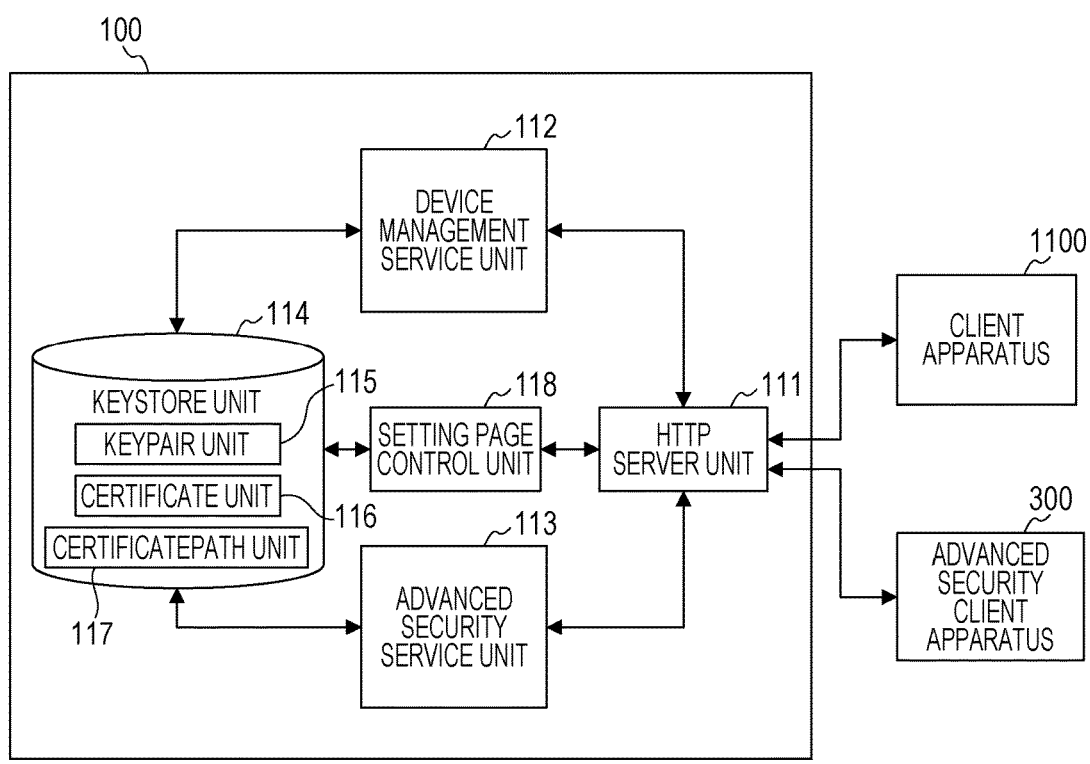
FIG. 11 is a block diagram illustrating a security communication system according to a second embodiment.

A control unit 103 of the imaging apparatus 100 according to this embodiment executes, in addition to the functions of the DM service unit 112 and the AS service unit 113, a function of a setting page control unit 118 described below. For example, a first processing unit 106 may execute the function of the setting page control unit 118. Other configurations are the same as those illustrated in FIG. 2A, and therefore, descriptions thereof are omitted. FIG. 11 is a diagram illustrating the imaging apparatus 100 and the client apparatus 1100 which performs a security setting on the imaging apparatus 100 using the setting page.

Furthermore, a functional configuration of the imaging apparatus 100 of this embodiment is described with reference to FIG. 11. The imaging apparatus 100 of this embodiment includes, as with the first embodiment, an HTTP server unit 111, a DM service unit 112, an AS service unit 113, and a keystore unit 114. The imaging apparatus 100 of the second embodiment is different from that of the first embodiment in its configuration in that the keystore unit 114 may be operated by the setting page control unit 118.

The setting page control unit 118 executes a command issued by the client apparatus 1100 (a first reception apparatus) which uses the setting page to the imaging apparatus 100 on the basis of the HTTP (a first communication procedure). The command based on the HTTP includes a command for recording first key pair information indicating that a public key (first public key information) used to perform encrypted communication corresponds to a private key (first private key information) used to perform the encrypted communication in the recording unit 104. Furthermore, the command based on the HTTP includes a command for transmitting key pair the information (first key pair information) indicating the correspondence relationship between the public key and the private key from the communication unit 105. Moreover, the command based on the HTTP includes a command for disabling (deleting, for example) the key pair information recorded in the recording unit 104. In addition, the command based on the HTTP includes a command for generating a self signed certificate which is certificate information used to prove that the public key information is valid information and which includes sign information added thereto by the setting page control unit 118. It is not necessarily the case that setting page control unit 118 executes all the commands, and the setting page control unit 118 executes at least one of the commands.

Figure 12:
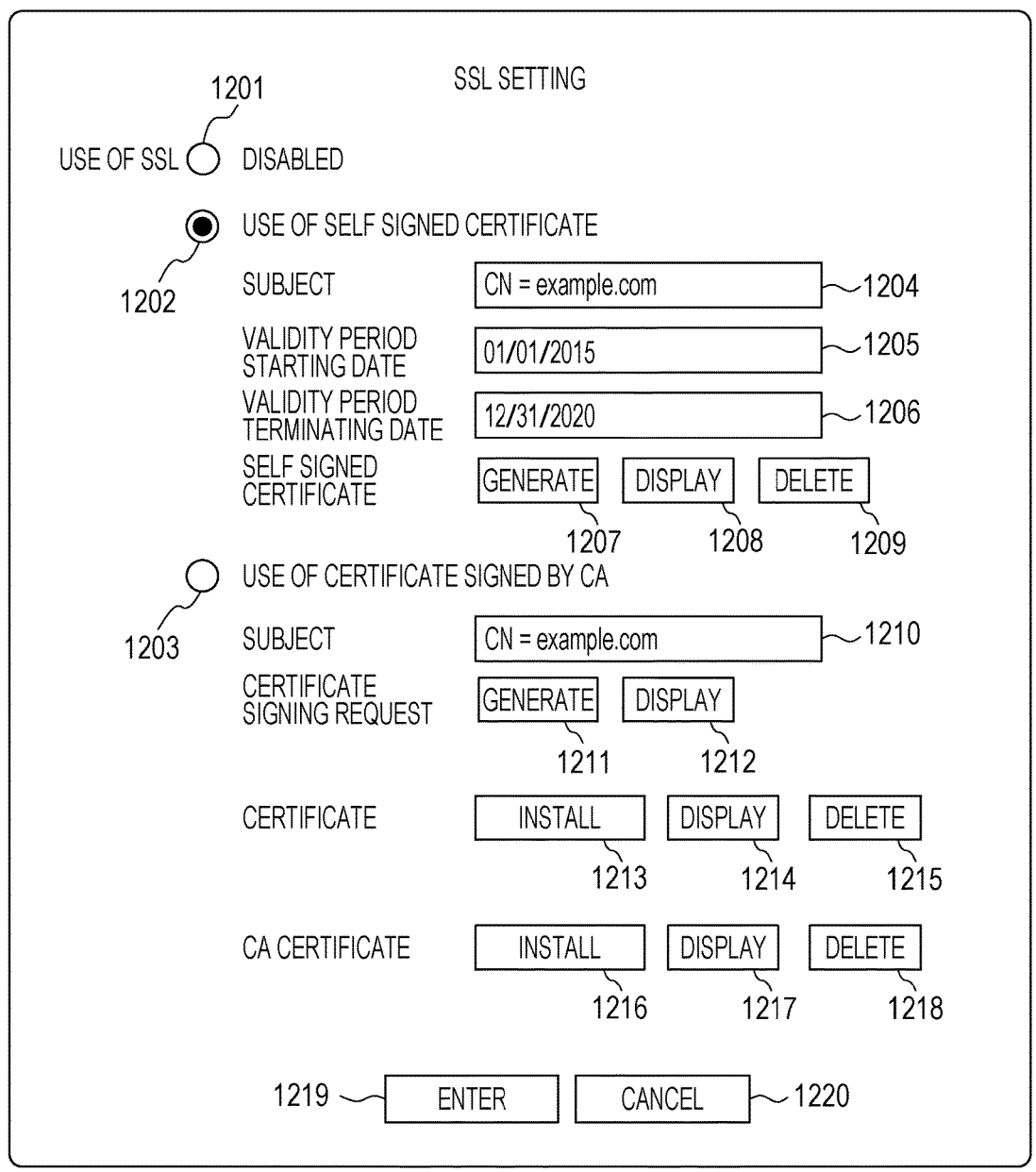
FIG. 12 is a diagram illustrating user interfaces of a setting page of the SSL.

If receiving a request of the setting page of the SSL from the client apparatus 1100, the imaging apparatus 100 of this embodiment transmits the setting page illustrated in FIG. 12 as a response.

Radio buttons (1201, 1202, and 1203) are displayed to select disabling of the SSL, use of a self signed certificate, or use of a certificate signed by the CA.

A subject 1204 is an entry field used to set a subject to be used for a self signed certificate. Input content is set to Subject and Issuer of the self-signed document. For example, "CN=example.com" is set in the subject 1204, and "example.com" is set to CommonName.

Furthermore, entry fields 1205 and 1206 are used to set a starting date and an ending date of a validity period, respectively. If a generation button 1207 is pressed after the subject 1204 and the entry fields 1205 and 1206 are set, a self signed certificate is generated. A display button 1208 is used to display the generated self signed certificate in another window by pop-up. A deletion button 1209 is used to delete the self signed certificate.

A subject 1210 is used to set a subject of a certificate sign request and is set by a method the same as that for the subject 1204. A generation button 1211 is used to generate a certificate sign request in accordance with the subject set in the subject 1210, and a display button 1212 is used to display the certificate sign request in another window by pop-up.

An installation button 1213 is used to instruct installation of a certificate signed by the CA in response to the certificate sign request. A certificate file is selected with reference to a file system of a device which executes the client apparatus 1100. A display button 1214 is used to instruct display of the certificate in another window. A deletion button 1215 is used to instruct deletion of the certificate.

An installation button 1216 is used to instruct installation of a CA certificate (a certificate in an intermediate layer or a cross root certificate) provided by the CA. If the installation button 1216 is selected, a certificate file is selected with reference to the system file of the device which executes the client apparatus 1100. A display button 1217 is used to display the certificate in another window. A deletion button 1218 is used to delete the certificate. An application button 1219 is used to reflect a setting. A cancel button 1220 is used to cancel the setting.

Figure 13:
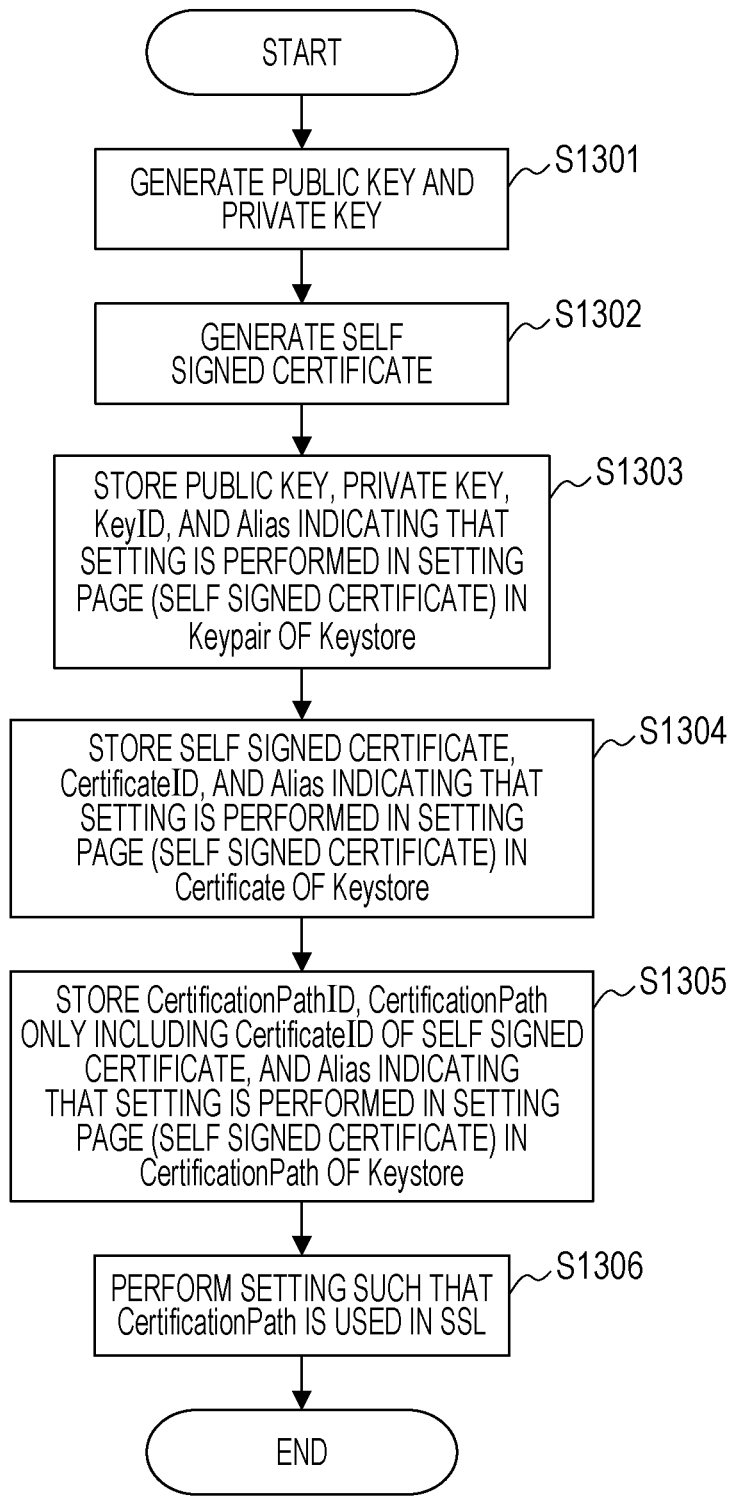
FIG. 13 is a flowchart illustrating a process of generating a self signed certificate.

A process performed when the radio button 1202 is selected, the subject 1204 and the entry fields 1205 and 1206 are set, and the generation button 1207 is pressed is described with reference to FIG. 13. By performing the setting in this way, a self signed certificate to be used in the SSL is generated in the imaging apparatus 100. The imaging apparatus 100 reflects content of the setting in the keystore unit 114.

The imaging apparatus 100 first generates a public key and a private key (S1302). Although an algorism of encryption and sign and a key length may be set, sha2WithRSAEncryption and 2048 bits are set as fixed settings. Generation of a public key, a private key, and a self signed certificate may be performed by the control unit 103. In the functional configuration of FIG. 11, a public key, a private key, and a self signed certificate may be generated by the HTTP server unit 111.

Subsequently, a self signed certificate is generated in accordance with the set values (S1302). Thereafter, the certificate and so on set in the setting page is stored in the keystore unit 114 so that the certificate and so on may be referred to by a security command of the DM and a command of the AS.

First, unique KeyID is generated in addition to the public key and the private key and stored in Keypair of the keystore unit 114. Furthermore, information indicating that the setting has been performed using the self signed certificate in the setting page is recorded in Alias thereof (S1303). Then, unique CertificateID is generated in addition to the self signed certificate and stored in the certificate unit 116 of the keystore unit 114. Information indicating that the setting has been performed using the self signed certificate in the setting page is recorded in Alias thereof (S1304).

Subsequently, a certification path including only one CertificateID and unique CertificationPathID are generated and stored in a certificationpath unit 117 of the keystore unit 114. Thereafter, information indicating that the setting has been performed using the self signed certificate in the setting page is set to Alias thereof (S1303). Furthermore, since the self signed certificate which is generated in the setting page of the SSL is naturally used in the SSL, the generated certification path is set to be used in the SSL (S1306).

At this point, a client apparatus 300 may refer to the private key and the public key of the self signed certificate generated in the setting page using a GetAllKeys command. Furthermore, the client apparatus 300 may refer to the self signed certificate using a GetAllCertificates command. Moreover, the client apparatus 300 may recognize that the self signed certificate has been set in a single stage using a GetCertificationPath command. Furthermore, the client apparatus 300 may recognize that the certification path is to be used in the SSL using a GetAssignedServerCertificates command. Moreover, since the information indicating that the setting has been performed using the self signed certificate in the setting page is set to Aliases, the information may be referred to when the client apparatus 300 refers to the setting or replaces the setting.

A process performed in a case where a user presses the display button 1208 in the client apparatus 1100 will be described. Information indicating that the setting has been performed using the self signed certificate in the setting page has been set to Alias of the certificate unit 116 of the keystore unit 114. Therefore, a list of certificates is obtained, one of the certificates corresponding to Alias is searched for, and the obtained certificate is displayed in the client apparatus 1100.

In a case where a setting of the self signed certificate has not been performed in the setting page of the SSL when the display button 1208 is operated, the following operation may be performed. Specifically, if a certification path which uses the self signed certificate has been set in the certificationpath unit 117, the self signed certificate set in the client apparatus 200 or the client apparatus 300 may be displayed. In this case, the certificationpath unit 117 is searched for a certification path used in the SSL. If such a certification path is included, a certificate is referred to using CertificateID set in the certificationpath unit 117, and if the certificate is the self signed certificate, the certificate is displayed in the client apparatus 1100.

Next, a process performed when the user presses the deletion button 1209 will be described. Information indicating that the setting has been performed using the self signed certificate in the setting page has been set to Aliases of the keypair unit 115, the certificate unit 116, and the certificationpath unit 117 of the keystore unit 114. If the deletion button 1209 is selected, the information is deleted. First, the certification path is set not to be used in the SSL. Thereafter, the certification path corresponding to Alias is deleted, and similarly, the certificate and the key pair are deleted in this order.

The deletion button 1209 may be used for deleting a setting performed using a self signed certificate in the CertificationPath unit 117 even if a setting of the self signed certificate is not performed in the setting page of the SSL. For example, a self signed certificate set in the client apparatus 200 or the client apparatus 300 may be deleted. In this case, the certificationpath unit 117 is searched for a certification path used in the SSL, and if such a certification path is detected, a certificate is referred to using CertificateID set in the certificationpath unit 117. If the certificate is a self signed certificate, the certification path is set not to be used in the SSL, and the certification path, the certificate, and the key pair are deleted in this order.

Next, a process performed when a certificate signed by the CA is used will be described. If a subject is set to the subject 1210 and the generation button 1211 is pressed, a public key and a private key are generated first. Thereafter, the public key, the private key, and unique KeyID are stored in the keypair unit 115 of the keystore unit 114, and information indicating the setting using the certificate signed by the CA is set to Alias thereof. Furthermore, a certificate sign request is generated using a value set in the subject 1210. If the display button 1212 is pressed, the certificate sign request generated by the generation button 1211 is displayed in another window which is independently generated in the client apparatus 1100.

FIG. 14 is a flowchart of a process performed when a certificate and a CA certificate are set by the installation buttons 1213 and 1216 in a case where the certificate signed by the CA is to be used. Here, Issuer of the certificate and CommonName of the CA certificate are checked so that it is determined whether the installed certificates have been generated in response to the certificate sign request and CertificationPath of the AS is appropriately set.

First, a key pair having Alias indicating that the certificate signed by the CA is to be used is obtained from the keypair unit 115 of the keystore unit 114 (S1401). Subsequently, a public key is obtained from the certificate installed by the installation button 1213 (S1402). Publickey of obtained Keypair and the public key of the certificate are compared with each other. If they do not match each other (No in step S1403), a combination of a public key and a private key is not appropriate, and accordingly, an error process is performed (S1412). If the matching is detected (Yes in step S1403), Issuer is obtained from the certificate so that a path of the certificate is checked (S1404) and Subject is obtained from the CA certificate (S1405).

Issuer and Subject thus obtained are compared with each other. If they do not match each other (No in step S1406), the path of the certificate is not appropriate, and accordingly, the error process is performed (S1402). If the matching is detected (Yes in step S1406), the process proceeds to step S1407. Although it is assumed that only one CA certificate is used in this embodiment, if a plurality of CA certificates exist, a plurality of paths of certificates are similarly required to be checked.

Next, the certificate set by the installation button 1213 is set to Certificate of the keystore unit 114. The certificate, unique CertificateID, and KeyID of Keypair obtained in step S1401 are stored in Certificate of the keystore unit 114. Then information indicating that the certificate signed by the CA certificate is to be used is set to Alias thereof (S1407).

Next, the CA certificate set by the installation button 1216 is set to the keypair unit 115 and the certificate unit 116 of the keystore unit 114. A public key and unique KeyID of the CA certificate are stored in the keypair unit 115 of the keystore unit 114, and information indicating that the certificate signed by the CA certificate is to be used is set to Alias thereof (S1408). Furthermore, the CA certificate, the unique CertificateID, and KeyID set in step S1408 are associated with one another and stored in Certificate of the keystore unit 114. Then information indicating that the certificate signed by the CA certificate is to be used is set to Alias thereof (S1409).

Subsequently, a certification path including CertificateID of the certificate set in step S1407 in a leading portion and including CertificateID of the CA certificate set in a portion after the leading portion is stored in the certificationpath unit 117 of the keystore unit 114. Then information indicating that the certificate signed by the CA certificate is to be used is set to Alias thereof (S1410). Finally, generated CertificationPath is set to be used in the SSL (S1411).

If the display button 1214 is pressed, a list of information recorded in the certificate unit 116 of the keystore unit 114 is obtained and Alias which indicates that the certificate signed by the CA certificate is to be used is searched for. Next, it is determined whether Privatekey is included in KeyIDs associated with Certificates. If Privatekey is detected, display is performed.

If the display button 1217 is pressed, a list of Certificates in the keystore unit 114 is obtained and a certificate corresponding to Alias which indicates that the certificate signed by the CA certificate is to be used is searched for. Subsequently, it is determined whether Privatekey is included in KeyIDs associated with Certificates. If Privatekey is not included, display is performed.

If the deletion button 1215 is pressed, the Keystore unit 114 is searched for a certification path having Alias which indicates information indicating that the certificate signed by the CA certificate is to be used. If such a certification path is detected, the certification path is set not to be used in the SSL, and furthermore, the certification path is deleted. Thereafter, a certificate corresponding to Alias which indicates information indicating that the certificate signed by the CA certificate is to be used is searched for. If KeyID associated with the certificate includes a private key, deletion is performed.

If the deletion button 1218 is pressed, the keystore unit 114 is searched for a certification path having Alias including information which indicates that the certificate signed by the CA certificate is to be used. If such a certification path is detected, the certification path is set not to be used in the SSL, and furthermore, the certification path is deleted. Thereafter, a certificate corresponding to Alias which includes information indicating that the certificate signed by the CA certificate is to be used is searched for. If KeyID associated with the certificate does not include a private key, deletion is performed.

The application button 1219 is used to perform a process of starting or stopping an SSL service in accordance with a selection of one of the radio buttons (1201, 1202, and 1203). Furthermore, if the cancel button 1220 is pressed, settings of a subject and a certificate being performed are cancelled.

Here, in a case of a setting using the certificate signed by the CA, the same Alias is set to the certificate and the CA certificate. However, different Aliases may be used. For the deletion of the certificate and the CA certificate and the deletion of the certification path, the certificate, and the key pair which is performed along with the deletion of the certificate and the CA certificate, searching may be performed using Aliases.

As described above, even if the setting of the SSL is performed in the setting page, the setting may also be referred to using a command of the AS service by setting a key pair, a certificate, and a certification path in the keystore unit 114. Furthermore, the setting of the SSL made in the setting page may be referred to using a security command of the DM by performing the process of the security command of the DM described in the first embodiment.

In this way, the communication unit 105 may transmit information indicating that a setting has been performed on the imaging apparatus 100 in response to a command based on the HTTP using the setting page in accordance with a command based on the AS service (a command used to refer to the setting). Furthermore, the communication unit 105 may transmit information indicating that a setting has been performed on the imaging apparatus 100 in response to a command based on the HTTP using the setting page in accordance with a command based on the DM service (a command used to refer to the setting).

Although the setting in the SSL is described in this embodiment, the setting may be reflected by setting Alias in another function using a certificate.

The second embodiment of the present invention have been described hereinabove. However, the present invention is not limited to these embodiments and various modifications and changes may be made within the scope of the present invention.

Other Embodiments

The present invention may be realized by a process of supplying a program which realizes at least one function of the foregoing embodiments to a system or an apparatus through a network or a recording medium and reading and executing the program by at least one processor of a computer included in the system or the apparatus. Furthermore, the present invention may be realized by a circuit (an ASIC, for example) which realizes at least one function.

The present invention is not limited to the foregoing embodiments, and various modifications and changes may be made without departing from the spirit and the scope of the present invention. Accordingly, the following claims are attached to disclose the scope of the present invention.

With the configuration described above, content of a setting associated with a security function performed on an information processing apparatus using a first communication procedure may not be referred to by a client apparatus which employs a second communication procedure different from the first communication procedure.

This application claims the benefit of International Patent Application No. PCT/JP2014/080094, filed Nov. 13, 2014, which is hereby incorporated by reference herein in its entirety.

The invention claimed is:

1. A camera comprising:
a hardware processor; and
a memory for storing instructions to be executed by the hardware processor,
wherein, when the instructions stored in the memory are executed by the hardware processor, the camera functions as:
a first processing unit configured to perform a setting for performing encrypted communication on the camera in response to a command based on a Device Management service defined in the Open Network Video Interface Forum (ONVIF) standard;
a second processing unit configured to perform a setting for performing encrypted communication on the camera in response to a command based on an Advanced security service defined in the ONVIF standard; and
a transmitting unit configured to transmit information indicating that the setting for performing the encrypted communication is made in response to the command based on the Device Management service defined in the ONVIF standard to a client apparatus if the command based on the Advanced security service defined in the ONVIF standard is received from the client apparatus after the first processing unit performs the setting for performing the encrypted communication on the camera in response to the command based on the Device Management service defined in the ONVIF standard.

2. The camera according to claim 1, further comprising: a control unit configured to control such that information indicating that the setting has been performed on the camera in response to the command based on the Device Management service is recorded in a recording unit.

3. The camera according to claim 2, wherein
the first processing unit executes at least one of a command for recording in the recording unit first key pair information indicating that first public key information used to perform the encrypted communication corresponds to first private key information used to perform the encrypted communication, a command for transmitting the first key pair information from the transmitting unit, a command for disabling the first key pair information recorded in the recording unit, and a command for generating certificate information which proves that the first public key information is valid key information and which includes sign information added thereto by the first processing unit, the commands being executed by a first client apparatus on the camera on the basis of the Device Management service,
the second processing unit executes a command for recording in the recording unit at least one of key pair information indicating that second public key information used to perform the encrypted communication corresponds to second private key information used to perform the encrypted communication, second certificate information which proves that the second public key information is valid key information, and certification path information indicating third certificate information associated with the second certificate information, the command being executed by a second client apparatus on the camera on the basis of the Advanced security service, and
the transmitting unit transmits, in response to the command based on the Advanced security service, information indicating that a setting has been performed on the camera in response to the command based on the Device Management service.

4. The camera according to claim 2, further comprising:
an imaging unit,
wherein the transmitting unit transmits an image captured by the imaging unit through the encrypted communication in accordance with the information recorded in the recording unit.

5. The camera according to claim 2, wherein
the first processing unit executes a command for setting to the camera at least one of first public key information which is used to perform the encrypted communication, first private key information which corresponds to the first public key information and which is used to perform the encrypted communication, and first certificate information which proves that the public key information is valid key information, the command being executed by a first client apparatus on the camera on the basis of the Device Management service, and
the second processing unit executes a command for setting to the camera at least one of key pair information indicating that second public key information used to perform the encrypted communication corresponds to second private key information used to perform the encrypted communication, second certificate information which proves that the second public key information is valid key information, and certification path information indicating third certificate information associated with the second certificate information, the command being executed by a second client apparatus on the camera on the basis of the Advanced security service.

6. The camera according to claim 5, wherein
the first processing unit generates certificate information which proves that the public key information is valid key information and which includes sign information added thereto by the first processing unit, the key pair information, and the certification path information in response to a command which is based on the Device Management service and which is issued for generating the first certificate information, and records the certificate information, the key pair information, and the certification path information in the recording unit, and
the control unit controls such that information indicating that the certificate information, the key pair information, and the certification path information have been generated in response to the command based on the Device Management service is recorded in the recording unit.

7. The camera according to claim 5, wherein
the first processing unit executes a first command which is based on the Device Management service and which is issued for requesting disabling of the certificate information recorded in the recording unit so as to disable the key pair information corresponding to the certificate information specified by the first command or the certification path information corresponding to the certificate information specified by the first command.

8. The camera according to claim 5, wherein
the certification path information indicates order of reference of a plurality of pieces of certificate information recorded in the recording unit performed by the camera for performing the encrypted communication, and
in response to a second command which is used to specify certificate information to be used for the encrypted communication and which is based on the Device Management service, the first processing unit records in the recording unit the certification path information indicating that certificate information corresponding to identification information specified by the second command is in a leading portion of the order as certification path information to be used for performing the encrypted communication.

9. The camera according to claim 5, wherein
the certification path information indicates order of reference of a plurality of pieces of certificate information recorded in the recording unit performed by the camera for performing the encrypted communication, and
the transmitting unit transmits information indicating certificate information, among the plurality of pieces of certificate information recorded in the recording unit, indicating that the certification path information is in a leading portion of the order in response to a command which is based on the Device Management service and which is issued for requesting transmission of information on the certificate information recorded in the recording unit.

10. The camera according to claim 5, wherein
the certification path information indicates order of reference of a plurality of pieces of certificate information recorded in the recording unit performed by the camera for performing the encrypted communication, and
in response to a third command for requesting obtainment of information indicates whether certificate information recorded in the recording unit is set as a certificate information used for performing the encrypted communication, the first processing unit records in the recording unit information indicating that fourth certificate information indicating that the certification path information among the plurality of certificate information is in a leading portion of the order is set as certificate information used to perform the encrypted communication and records in the recording unit information indicating that a setting for using fifth certificate information different from the fourth certificate information, among the plurality of pieces of certificate information, for performing the encrypted communication has not been made.

11. The camera according to claim 10, wherein
if the first processing unit executes the third command, the transmitting unit does not transmit certificate information which is not associated with the key pair information among the plurality of pieces of certificate information.

12. The camera according to claim 5, wherein
the control unit records keystore information and alias information which are based on the Advanced security service in the recording unit and records information indicating that a setting has been performed on the camera in response to a command based on the Device Management service in the recording unit as the alias information.

13. The camera according to claim 12, wherein
the first processing unit executes at least one of a LoadCertificates command, a LoadCACertificates command, a LoadCertificateWithPrivateKey command, and the LoadCertificateWithPrivateKey command which are commands based on the Device Management service and which are commands used to load the first certificate information in the camera, and
if the first processing unit executes at least one of the LoadCertificates command, the LoadCACertificates command, the LoadCertificateWithPrivateKey command, and the LoadCertificateWithPrivateKey command on the basis of the Device Management service, the control unit records information indicating that loading of a certificate has been performed using the Device Management service in the recording unit as the alias information.

14. The camera according to claim 12, wherein
the control unit records the key pair information and the second certificate information which are associated with each other in the recording unit,
the first processing unit executes a GetCertificates command which is a command based on the Device Management service and which is a command for requesting the camera to transmit certificate information and a GetCACertificates which is a command provided by the Device Management service and which is a command for requesting the camera to transmit certificate information issued by a certification authority, and
the transmitting unit transmits the second certificate information associated with the key pair information if the first processing unit executes the GetCertificates command and transmits third certificate information which is not associated with the key pair information if the first processing unit executes the GetCACertificates command.

15. The camera according to claim 12, wherein
the first processing unit executes a DeleteCertificates command which is a command based on the Device Management service and which is a command for requesting deletion of certificate information recorded in the recording unit so as to delete the key pair information corresponding to the certificate information specified by the DeleteCertificates command or the certification path information corresponding to the certificate information specified by the DeleteCertificates command from the recording unit.

16. A method for controlling a camera, the method comprising:
a first processing step of performing a setting for performing encrypted communication on the camera in response to a command based on a Device Management service defined in the Open Network Video Interface Forum (ONVIF) standard;
a second processing step of performing a setting for performing encrypted communication on the camera in response to a command based on an Advanced security service defined in the ONVIF standard; and
a transmitting step of transmitting information indicating that the setting for performing the encrypted communication is made in response to the command based on the Device Management service defined in the ONVIF standard to a client apparatus if the command based on the Advanced security service defined in the ONVIF standard is received from the client apparatus after the setting for performing the encrypted communication is performed on the camera in response to the command based on the Device Management service defined in the ONVIF standard in the first processing step.

17. The control method according to claim 16, further comprising:
a control step of performing control such that information indicating that the setting has been performed on the camera in response to the command based on the Device Management service is recorded in a recording unit.

18. The control method according to claim 17, wherein
in the first processing step, a command for setting to the camera at least one of first public key information which is used to perform the encrypted communication, first private key information which corresponds to the first public key information and which is used to perform the encrypted communication, and first certificate information which proves that the public key information is valid key information is executed, the command being executed by a first client apparatus on the camera on the basis of the Device Management service, and
in the second processing step, a command for setting to the camera at least one of key pair information indicating that second public key information used to perform the encrypted communication corresponds to second private key information used to perform the encrypted communication, second certificate information which proves that the second public key information is valid key information, and certification path information indicating third certificate information associated with the second certificate information is executed, the command being executed by a second client apparatus on the camera on the basis of the Advanced security service.

19. A non-transitory recording medium storing a program that causes a camera with one or more processors to execute:
- a first processing process of performing a setting for performing encrypted communication on the camera in response to a command based on a Device Management service defined in the Open Network Video Interface Forum (ONVIF) standard;
- a second processing process of performing a setting for performing encrypted communication on the camera in response to a command based on an Advanced security service defined in the ONVIF standard; and
- a transmitting process of transmitting information indicating that the setting for performing the encrypted communication is made in response to the command based on the Device Management service defined in the ONVIF standard to a client apparatus if the command based on the Advanced security service defined in the ONVIF standard is received from the client apparatus after the setting for performing the encrypted communication is performed on the camera in response to the command based on the Device Management service defined in the ONVIF standard in the first processing process.

* * * * *